US012578969B2

(12) United States Patent
Chao et al.

(10) Patent No.: US 12,578,969 B2
(45) Date of Patent: Mar. 17, 2026

(54) BIOS CODE STORAGE SUBSYSTEM MODIFICATION SYSTEM WHEREIN BASED ON FIRST OR SECOND INITIALIZATION OF COMPUTING DEVICE PERFORM A REBOOT

(71) Applicant: Dell Products L.P., Round Rock, TX (US)

(72) Inventors: Ching-Lung Chao, Austin, TX (US); Yiping Zhou, Houston, TX (US); David Keith Chalfant, Round Rock, TX (US); Wei Liu, Austin, TX (US); Parth Girishkumar Bera, Bangalore (IN); Po-Yu Cheng, Tainan (TW); Yu-Hsuan Chou, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 267 days.

(21) Appl. No.: 18/488,287

(22) Filed: Oct. 17, 2023

(65) Prior Publication Data

US 2025/0123847 A1 Apr. 17, 2025

(51) Int. Cl.
*G06F 9/4401* (2018.01)

(52) U.S. Cl.
CPC .................................. *G06F 9/4403* (2013.01)

(58) Field of Classification Search
CPC ...................................................... G06F 9/4403
See application file for complete search history.

(56) References Cited

U.S. PATENT DOCUMENTS

| | | | | |
|---|---|---|---|---|
| 11,977,753 B2 * | 5/2024 | Poosapalli | ............ | G06F 9/4401 |
| 12,223,330 B2 * | 2/2025 | Liu | ........................ | G06F 9/4411 |
| 2005/0033954 A1 * | 2/2005 | Wang | .................. | G06F 11/1417 |
| | | | | 713/2 |
| 2017/0308447 A1 * | 10/2017 | Wu | ........................ | G11C 29/44 |
| 2019/0019569 A1 | 1/2019 | Pope | | |
| 2020/0356357 A1 * | 11/2020 | Narasimhan | .......... | G06F 15/167 |

* cited by examiner

*Primary Examiner* — Tammara R Peyton
(74) *Attorney, Agent, or Firm* — Joseph Mencher

(57) ABSTRACT

A BIOS code storage subsystem modification system includes a computing device having BIOS code storage device modification subsystem coupled to a BIOS storage system that includes a BIOS code storage device and a BIOS data storage device. The BIOS code storage device modification subsystem receives a BIOS code storage device modification interrupt and, in response, provides BIOS code storage device modification information in the BIOS data storage device. Subsequent to providing the BIOS code storage device modification information in the BIOS data storage device, the BIOS code storage device modification subsystem causes the computing device to perform a first reboot. During a first initialization of the computing device in response to the first reboot, a BIOS in the computing device identifies the BIOS code storage device modification information in the BIOS data storage device, and uses the BIOS code storage device modification information to modify the BIOS code storage device.

20 Claims, 22 Drawing Sheets

300

BIOS CODE STORAGE DEVICE MODIFICATION SUBSYSTEM CAUSES REBOOT
318

PROCESSING SYSTEM IDENTIFIES BIOS CODE STORAGE DEVICE MODIFICATION INFORMATION IN BIOS CODE STORAGE DEVICE DURING INITIALIZATION
320

PROCESSING SYSTEM USES BIOS CODE STORAGE DEVICE MODIFICATION INFORMATION TO PERFORM OPERATIONS DURING INITIALIZATION
322

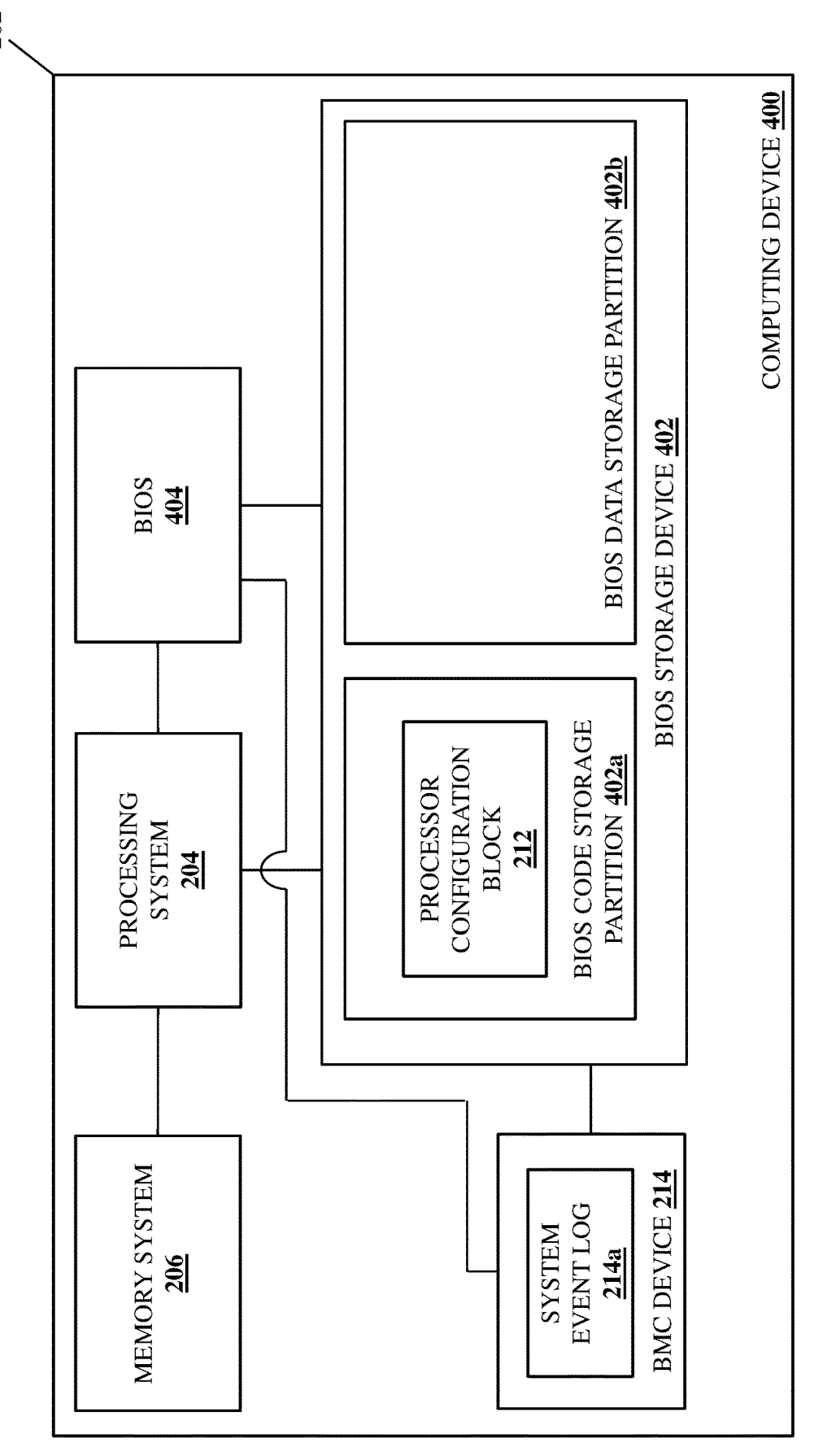

COMPUTING DEVICE 400

BIOS 404

PROCESSING SYSTEM 204

MEMORY SYSTEM 206

406

BIOS STORAGE DEVICE 402

BIOS DATA STORAGE PARTITION 402b

BIOS CODE STORAGE PARTITION 402a

PROCESSOR CONFIGURATION BLOCK 212

BMC DEVICE 214

SYSTEM EVENT LOG 214a

202

COMPUTING DEVICE 400

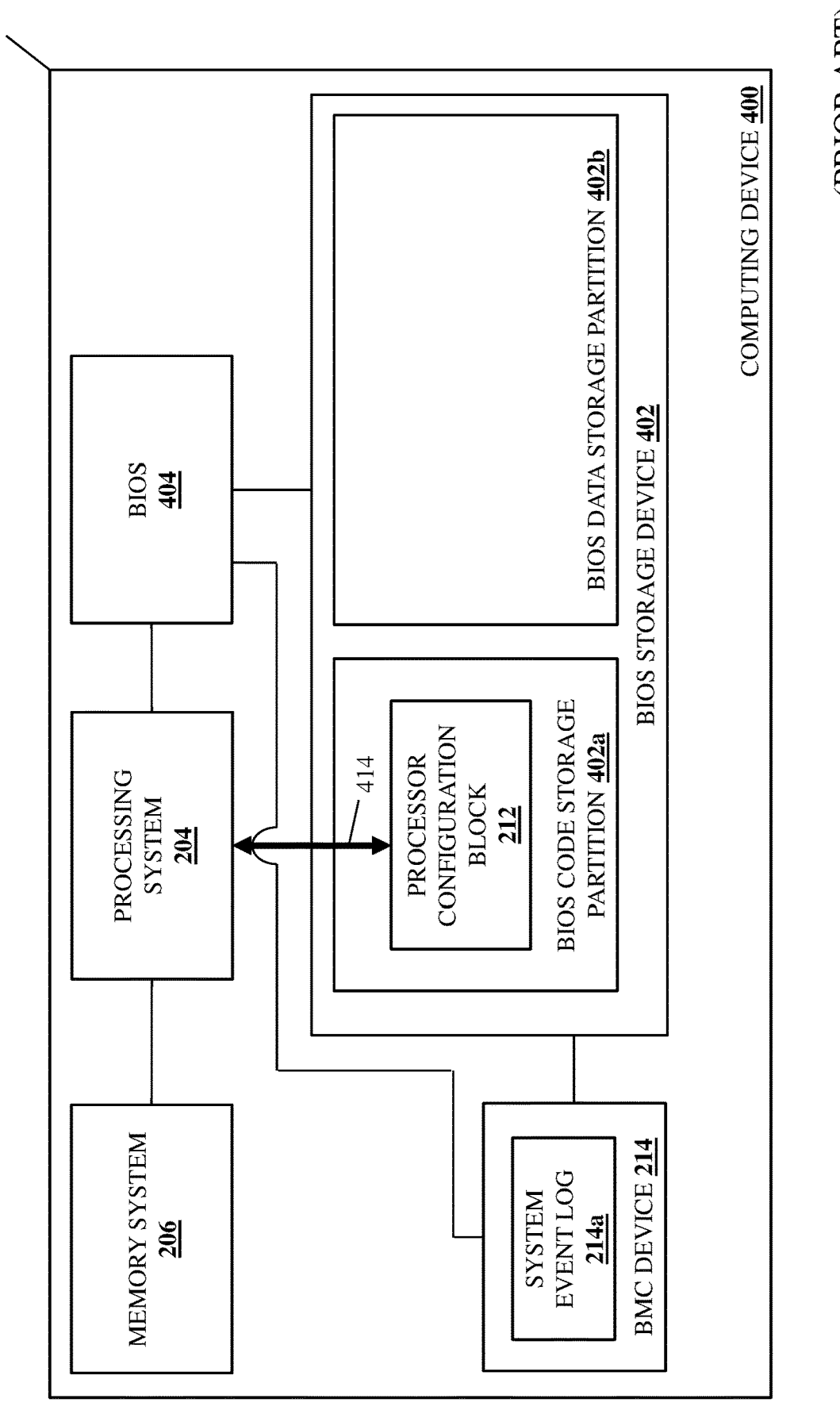

COMPUTING DEVICE 400

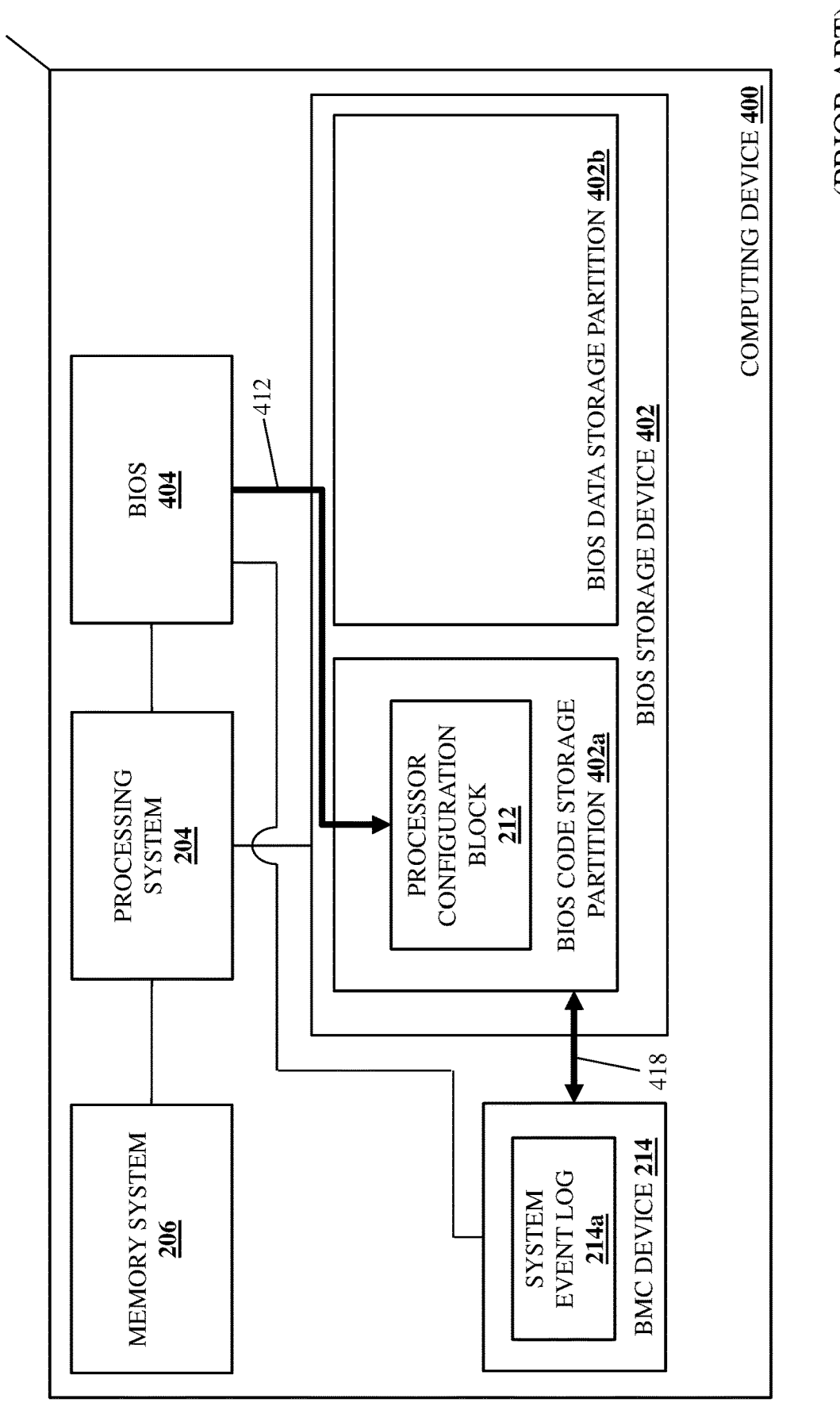

BIOS CODE STORAGE SUBSYSTEM MODIFICATION SYSTEM WHEREIN BASED ON FIRST OR SECOND INITIALIZATION OF COMPUTING DEVICE PERFORM A REBOOT

BACKGROUND

The present disclosure relates generally to information handling systems, and more particularly to modifying a Basic Input/Output System (BIOS) code storage subsystem in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and other computing devices known in the art include a Basic Input/Output System (BIOS) that one of skill in the art will recognize is provided by firmware that is configured to perform hardware initialization for the computing device during boot or other initialization of the computing device, as well as runtime services for an operating system or other applications/programs provided in the computing device. Such BIOS are typically provided using a BIOS storage device (e.g., a BIOS Serial Peripheral Interface (SPI) storage device) that is configured with a BIOS code storage partition that stores the BIOS code that is used to provide the BIOS, and a BIOS data storage partition that stores data used by the BIOS. However, the inventors of the present disclosure have identified issues associated with the modification of the BIOS code storage partition in such conventional BIOS storage device.

For example, some computing devices store information in the BIOS code storage partition (i.e., along with the BIOS code discussed above) that may require modification as part of the operation of the computing device. To provide a specific example, some computing devices may include an Advanced Micro Devices (AMD) Secure Processor (ASP) provided by AMD, Inc. of Santa Clara, California, United States, and may store an AMD Generic Encapsulated Software Architecture (AGESA) AMD ASP Configuration Block (APCB) structure in the BIOS code storage partition that may require modification in the event of a memory system issue in the computing device.

As will be appreciated by one of skill in the art in possession of the present disclosure, in the event a memory device in the memory system in the computing device fails or otherwise becomes unavailable, a processing system in the computing device will detect that unavailable memory device during runtime of the computing device (i.e., when an operating system in the computing device controls the computing device) and, in response, will generate and transmit a System Management Interrupt (SMI) to the BIOS in the computing device. The computing device will then enter a System Management Mode (SMM), and the BIOS will log a memory device error in a System Event Log (SEL) for the computing device, and schedule Post Package Repair (PPR) operations to repair that memory device following a subsequent initialization of the computing device by modifying the AGESA APCB structure in the BIOS code storage partition. One of skill in the art will appreciate that such modification of the AGESA APCB structure takes a relatively long time (e.g., ~130 ms) while the computing device remains in the SMM.

Furthermore, such computing devices often include a Baseboard Management Controller (BMC) device such as the integrated DELL® Remote Access Controller (iDRAC) device provided in server devices available from DELL® Inc. of Round Rock, Texas, United States, and such BMC devices may be configured to periodically access (e.g., scan) the BIOS code storage partition and verify the integrity of the BIOS code stored in the BIOS code storage partition (e.g., by hashing that BIOS code to generate a hash value, and comparing that hash value to a "golden" hash value associated with known/trusted BIOS code). However, in the event the BMC device is verifying the integrity of the BIOS code stored in the BIOS code storage partition when the BIOS attempts to schedule the PPR operations by modifying the AGESA APCB structure in the BIOS code storage partition, the computing device will "freeze", "hang", or otherwise become unavailable.

Accordingly, it would be desirable to enable the modification of a BIOS code storage subsystem without experiencing the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) code storage device modification engine that is configured to: receive a BIOS code storage device modification interrupt; provide, in response to receiving the BIOS code storage device modification interrupt, BIOS code storage device modification information in a BIOS data storage device that is included in a BIOS storage system; cause, subsequent to providing the BIOS code storage device modification information in the BIOS data storage device, the IHS to perform a first reboot; identify, during a first initialization of the IHS in response to the first reboot, the BIOS code storage device modification information in the BIOS data storage device; and use, during the first initialization of the IHS in response to the first reboot, the BIOS code storage device modification information to modify a BIOS code storage device that is included in a BIOS storage system.

BRIEF DESCRIPTION OF THE DRAWINGS

FIG. 4A is a schematic view illustrating an embodiment of a conventional computing device.

FIG. 4F is a schematic view illustrating an embodiment of the conventional computing device of FIG. 4A using a conventionally modified BIOS code storage subsystem in the conventional computing device.

FIG. 4H is a schematic view illustrating an embodiment of an issue that can occur in the conventional computing device of FIG. 4A with the conventional modification of a BIOS code storage subsystem in the conventional computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
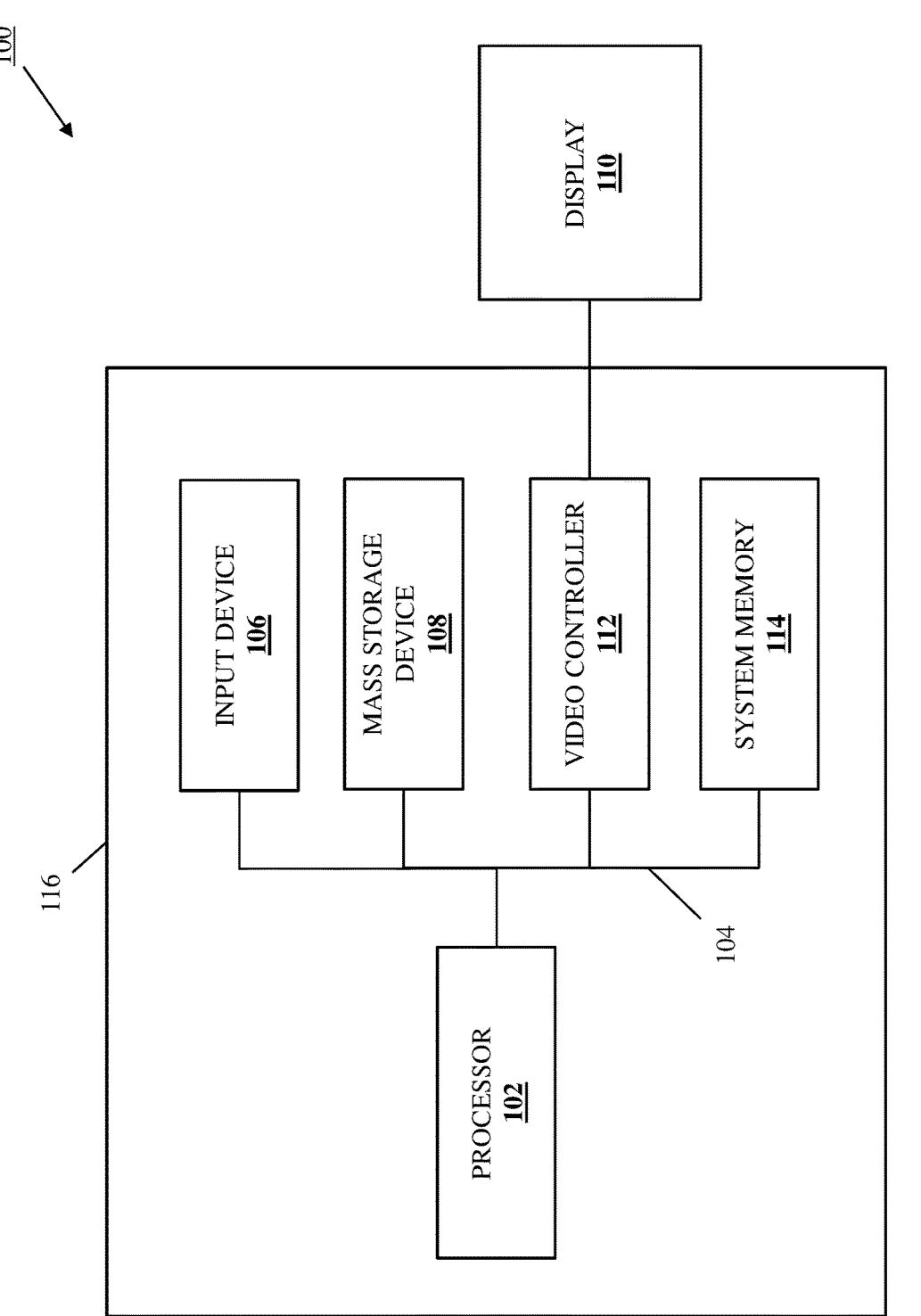
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
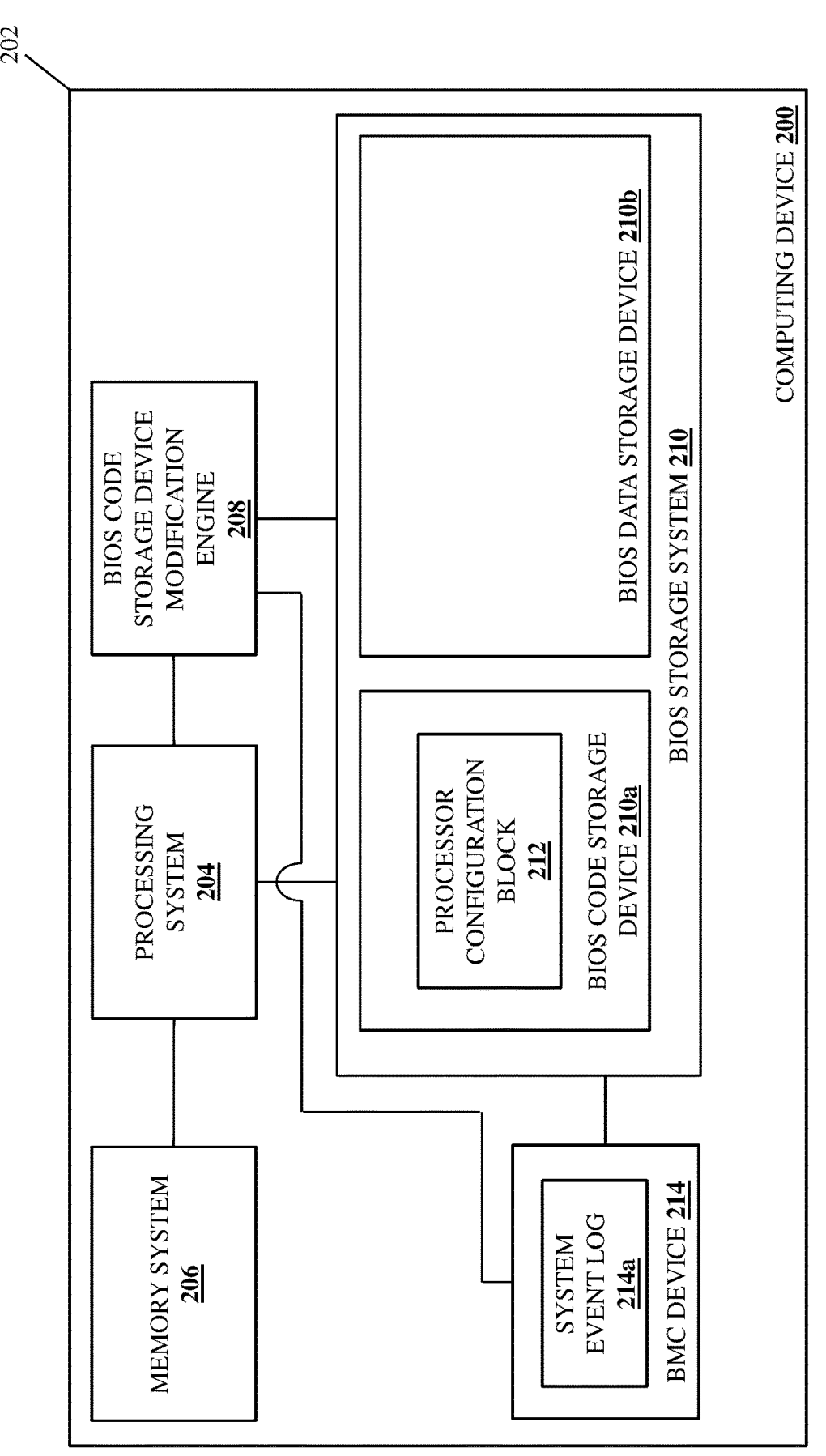
FIG. 2 is a schematic view illustrating an embodiment of a computing device that may include the BIOS code storage subsystem modification system of the present disclosure.

Referring now to FIG. 2, an embodiment of a computing device 200 is illustrated that may provide the BIOS code storage subsystem modification system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a processing system that one of skill in the art in possession of the present disclosure will appreciate may be provided by a Central Processing Unit (CPU) available from Advanced Micro Devices (AMD®), Inc. of Santa Clara, California, United States. In a specific example, the processing system 204 may include a secure processing subsystem (e.g., the AMD® Platform Secure Processor (PSP) provided with CPUs available from AMD, Inc as discussed above) and/or any other processing system components that would be apparent to one of skill in the art in possession of the present disclosure. The chassis 202 also houses a memory system 206 that is coupled to the processing system 204. In an embodiment, the memory system 206 may include a plurality of memory devices such as, for example, Dual Inline Memory Module (DIMM) memory devices and/or other memory devices that would be apparent to one of skill in the art in possession of the present disclosure.

As illustrated, the chassis 202 also houses a Basic Input/Output System (BIOS) code storage device modification engine 208 that is configured to perform the functionality of any of the BIOS code storage device modification engines and/or computing devices discussed below. As will be appreciated by one of skill in the art in possession of the present disclosure, in some embodiments the chassis 202 may also house a BIOS processing system (not illustrated, but which may be provided by any of a variety of BIOS firmware that would be apparent to one of skill in the art in possession of the present disclosure) and a BIOS memory system (not illustrated, but which may be provided by any of a variety of BIOS firmware that would be apparent to one of skill in the art in possession of the present disclosure) that includes instructions that, when executed by the BIOS processing system, cause the BIOS processing system to provide a BIOS that provides the BIOS code storage device modification engine 208. In other words, a BIOS in the computing device 200 that is configured to perform hardware initialization for the computing device 200 during boot or other initialization of the computing device 200, as well as runtime services for an operating system or other applications/programs provided in the computing device 200, may also be configured to perform any of the functionality of the BIOS code storage device modification engine 208 discussed below.

However, as will also be appreciated by one of skill in the art in possession of the present disclosure, in some embodiments the BIOS code storage device modification engine 208 may be provided by a combination of the BIOS in the computing device 200 (e.g., that may perform the operations of the BIOS code storage device modification engine 208 during the initialization of the computing device 200) and an application (e.g., an operating system or other application running in the computing device that may perform the operations of the BIOS code storage device modification engine 208 during runtime of the computing device 200 following its initialization).

As such, while illustrated and described herein as separate components, one of skill in the art in possession of the present disclosure will recognize how in some embodiments the processing system 204 (e.g., a "primary" processing system in this example) may be configured to execute instructions that are stored in the memory system 206 (a "primary" memory system in this example) in order to provide an application that is configured to perform some of the functionality of the BIOS code storage device modification engine 208 discussed below, while a BIOS processing system in the computing device 200 may be configured to execute instructions that are stored in a BIOS memory system in order to provide a BIOS that is configured to perform some of the functionality of the BIOS code storage device modification engine 208 discussed below. However, while several specific examples of implementations of the BIOS code storage device modification engine 208 have been described, one of skill in the art in possession of the present disclosure will appreciate how the BIOS code storage device modification engine 208 may be provided in a variety of manners that will fall within the scope of the present disclosure as well.

In the illustrated embodiment, the chassis 202 also houses a BIOS storage system 210 that includes a BIOS code storage device 210a and a BIOS data storage device 210b, each of which may be provided by Non-Volatile Random Access Memory (NVRAM) devices and/or other memory devices that would be apparent to one of skill in the art in possession of the present disclosure. For example, the BIOS storage system 210 may include a first Serial Peripheral Interface (SPI) flash storage device that provides the BIOS code storage device 210a and that is accessible via a first communication bus or other connection, and a second SPI flash storage device that provides the BIOS data storage device 210b and that is separate from the first SPI flash storage device and accessible via a second communication bus or other connection and is separate from the first communication bus.

As discussed in further detail below, the BIOS storage system 210 differs from conventional BIOS storage systems that are provided by a single BIOS storage device that is partitioned to provide a BIOS code storage partition and a BIOS data storage partition that are each accessible via the same communication bus (i.e., the communication bus connected to their BIOS storage device). In other words, the "BIOS code storage subsystem" of the present disclosure may be provided by a first BIOS storage device that is separate from a second BIOS storage device that provides the "BIOS data storage subsystem" of the present disclosure (with each of the first and second BIOS storage devices having respective communication buses), while conventional computing devices provide their BIOS code storage subsystem and BIOS data storage subsystem as respective partitions in the same BIOS data storage device having a single communication bus as described herein. Furthermore, one of skill in the art in possession of the present disclosure will appreciate how the BIOS storage system 210 also differs from conventional BIOS storage systems that provide a primary BIOS storage device, along with a redundant BIOS storage device that stores a copy of the information included on the primary BIOS storage device, in order to provide redundancy in the event the primary BIOS storage device becomes unavailable.

Similarly as discussed above, the BIOS code storage device 210 may store BIOS code that is used to provide the BIOS for the computing device 200 (i.e., in addition to any of the other information that may be stored in the BIOS code storage device 210*a* as discussed below), and the BIOS data storage device 210*b* may store data used by the BIOS in the computing device 200 (i.e., in addition to any of the other information that may be stored in the BIOS data storage device 210*b* as discussed below). For example, FIG. 2 illustrates how the BIOS code storage device 210*a* may store a processor configuration block 212 such as, for example, the AGESA APCB structure described above (e.g., in addition to BIOS code, not illustrated), the use of which is described for some of the specific embodiments of the present disclosure discussed below.

However, while the computing device 200 is illustrated and described herein as including a BIOS and BIOS components such as the BIOS storage subsystem 210, one of skill in the art in possession of the present disclosure will appreciate how that BIOS and those BIOS components may be provided by a Unified Extensible Firmware Interface (UEFI) and UEFI components provided according to the UEFI specification, which defines an architecture of platform firmware used for booting or otherwise initializing computing devices, along an interface for interacting with an operating system in computing devices, and is used in many computing devices in place of a conventional BIOS.

As illustrated, the chassis 202 may also house a Baseboard Management Controller (BMC) device 214 that is coupled to the BIOS code storage device modification engine 208 (e.g., via a coupling between the BMC device 214 and the processing system(s) that provide the BIOS code storage device modification engine 208), and that is coupled to the BIOS storage system 210. In an embodiment, the BMC device 214 may be provided by the integrated DELL® Remote Access Controller (iDRAC) device provided in server devices available from DELL®, Inc. of Round Rock, Texas, United States, and/or any other BMC devices that would be apparent to one of skill in the art in possession of the present disclosure. As illustrated, the BMC device 214 may store a System Event Log (SEL) 214*a* for the computing device 200, the use of which is described for some of the specific embodiments of the present disclosure discussed below. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BIOS code storage subsystem modification functionality discussed below, while remaining within the scope of the present disclosure as well.

Figure 3A:
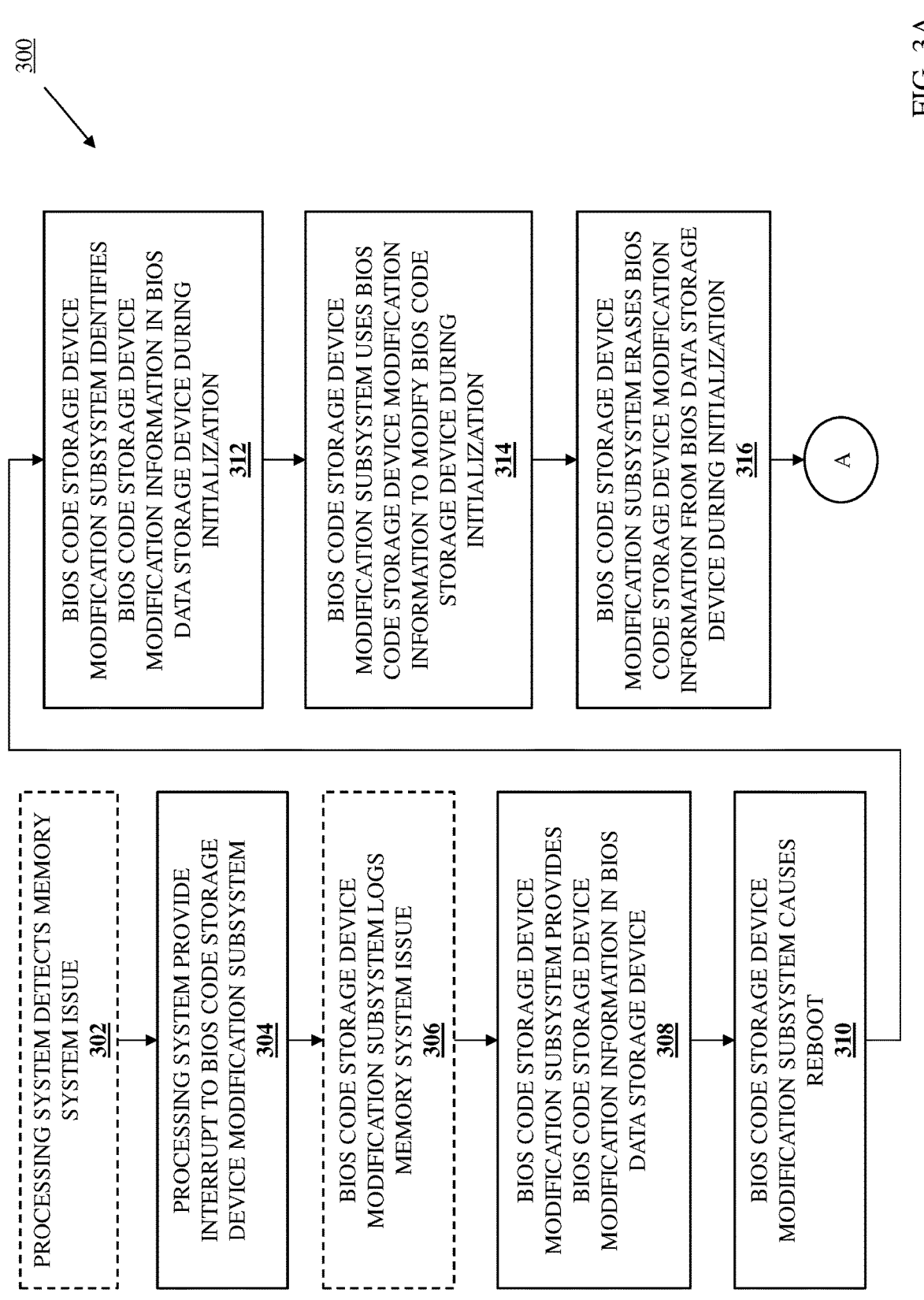
FIGS. 3A and 3B are a flow chart illustrating an embodiment of a method for modifying a BIOS code storage subsystem.
Figure 3B:
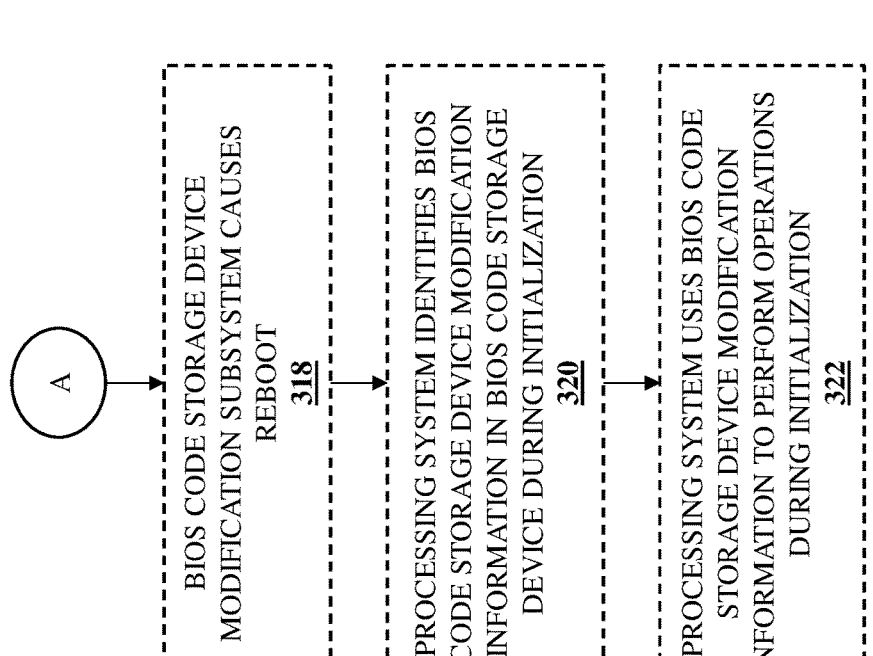

Referring now to FIGS. 3A and 3B, an embodiment of a method 300 for modifying a Basic Input/Output System (BIOS) code storage subsystem is illustrated. As discussed below, the systems and methods of the present disclosure provide a BIOS storage system in a computing device having BIOS data storage device that is separate from a BIOS code storage device, store BIOS code storage device modification information in the BIOS data storage device during runtime of the computing device, and then use that BIOS code storage device modification information to update the BIOS code storage device on a subsequent initialization of the computing device. For example, the BIOS code storage subsystem modification system of the present disclosure may include a computing device having BIOS code storage device modification subsystem coupled to a BIOS storage system that includes a BIOS code storage device and a BIOS data storage device. The BIOS code storage device modification subsystem receives a BIOS code storage device modification interrupt and, in response, provides BIOS code storage device modification information in the BIOS data storage device. Subsequent to providing the BIOS code storage device modification information in the BIOS data storage device, the BIOS code storage device modification subsystem causes the computing device to perform a first reboot. During a first initialization of the computing device in response to the first reboot, a BIOS in the computing device identifies the BIOS code storage device modification information in the BIOS data storage device, and uses the BIOS code storage device modification information to modify the BIOS code storage device. As such, the accessing of BIOS code in the BIOS storage system by other components in the computing device during runtime of the computing device will not cause issues with the modification of the BIOS code storage device.

Figure 4B:
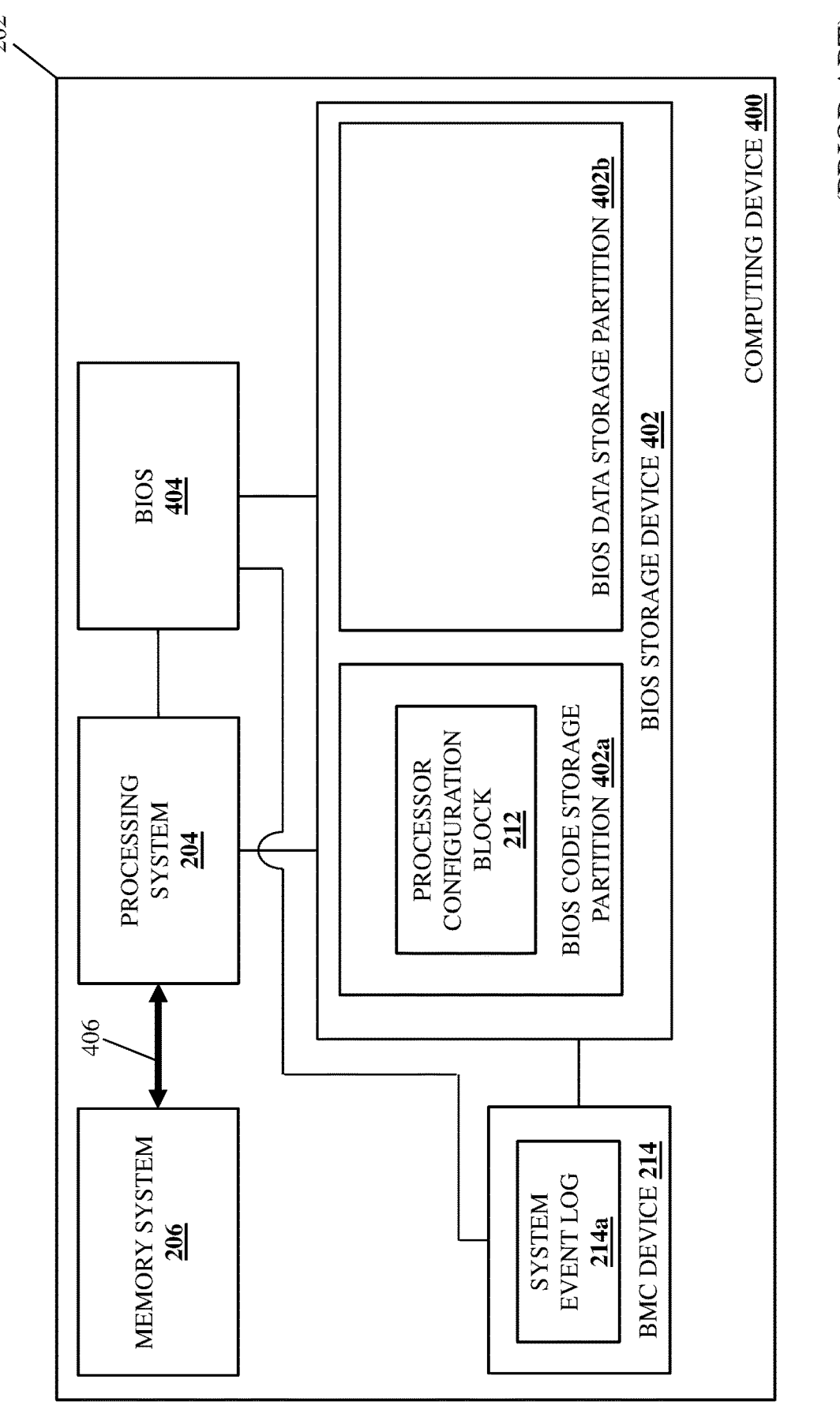
FIG. 4B is a schematic view illustrating an embodiment of the conventional computing device of FIG. 4A performing operations associated with the conventional modification of a BIOS code storage subsystem in the conventional computing device.

With reference to FIGS. 4A-4H, an embodiment of the operation of a conventional BIOS code storage subsystem modification system is illustrated and briefly described for comparison to the operation of the BIOS code storage subsystem modification system of the present disclosure. With reference to FIG. 4A, an embodiment of a conventional computing device 400 including a conventional BIOS code storage subsystem modification system is illustrated, with the conventional computing device 400 including some components that are similar to the computing system 200 discussed above with reference to FIG. 2 and that have been provided with the same element numbers. As can be seen, the conventional computing device 400 provides a BIOS storage device 402 (e.g., a SPI flash storage device) in place of the BIOS storage system 212 of the computing device 200 discussed above with reference to FIG. 2, with the BIOS storage device 402 configured with a BIOS code storage partition 402*a* and a BIOS data storage partition 402*b*. Similarly as discussed above, the BIOS code storage partition 402*a* may store BIOS code that is used to provide the BIOS for the computing device 200 (i.e., in addition to any of the other information that may be stored in the BIOS code storage partition 402*a* as discussed below), and the BIOS data storage partition 402*b* may store data used by the BIOS in the computing device 200. In the illustrated embodiment, the BIOS code storage partition 402*a* stores the processor configuration block 212 (e.g., AGESA APCB structure described above in addition to BIOS code, not illustrated), which is used in the specific example provided below.

The conventional computing device 400 also provides a BIOS 404 in place of the BIOS code storage device modification engine 208 in the computing device 200 discussed above with reference to FIG. 2. As discussed above, the BIOS storage device 402 may include a single communication bus that is accessible by each of the processing system 204, the BIOS 404, and the BMC device 214 to couple them to the BIOS storage device 402. However, while a specific conventional computing device and conventional BIOS code storage subsystem modification system has been illustrated and described, one of skill in the art in possession of the present disclosure will appreciate how conventional computing devices and conventional BIOS code storage subsystem modification systems may include other components and/or component configurations as well.

The conventional operation of the conventional BIOS code storage subsystem modification system in the conventional computing device 400 will now be described with regard to the modification of the BIOS code storage partition 402*a* in response to a memory system issue, but one of skill in the art in possession of the present disclosure will appreciate how conventional BIOS code storage subsystem modification systems may use similar techniques to modify BIOS code storage partitions for other reasons as well. With reference to FIG. 4B, during runtime operations of the conventional computing device 400 (e.g., when an operating system provided in the conventional computing device 400 controls the conventional computing device 400), the processing system 204 in the conventional computing device 400 performs memory system analysis operations 406 that include analyzing the memory system 206 and identifying a "bad", failing, or otherwise unavailable memory device in the memory system 206 (e.g., via the detection of correctable and uncorrectable errors in that memory device).

Figure 4C:
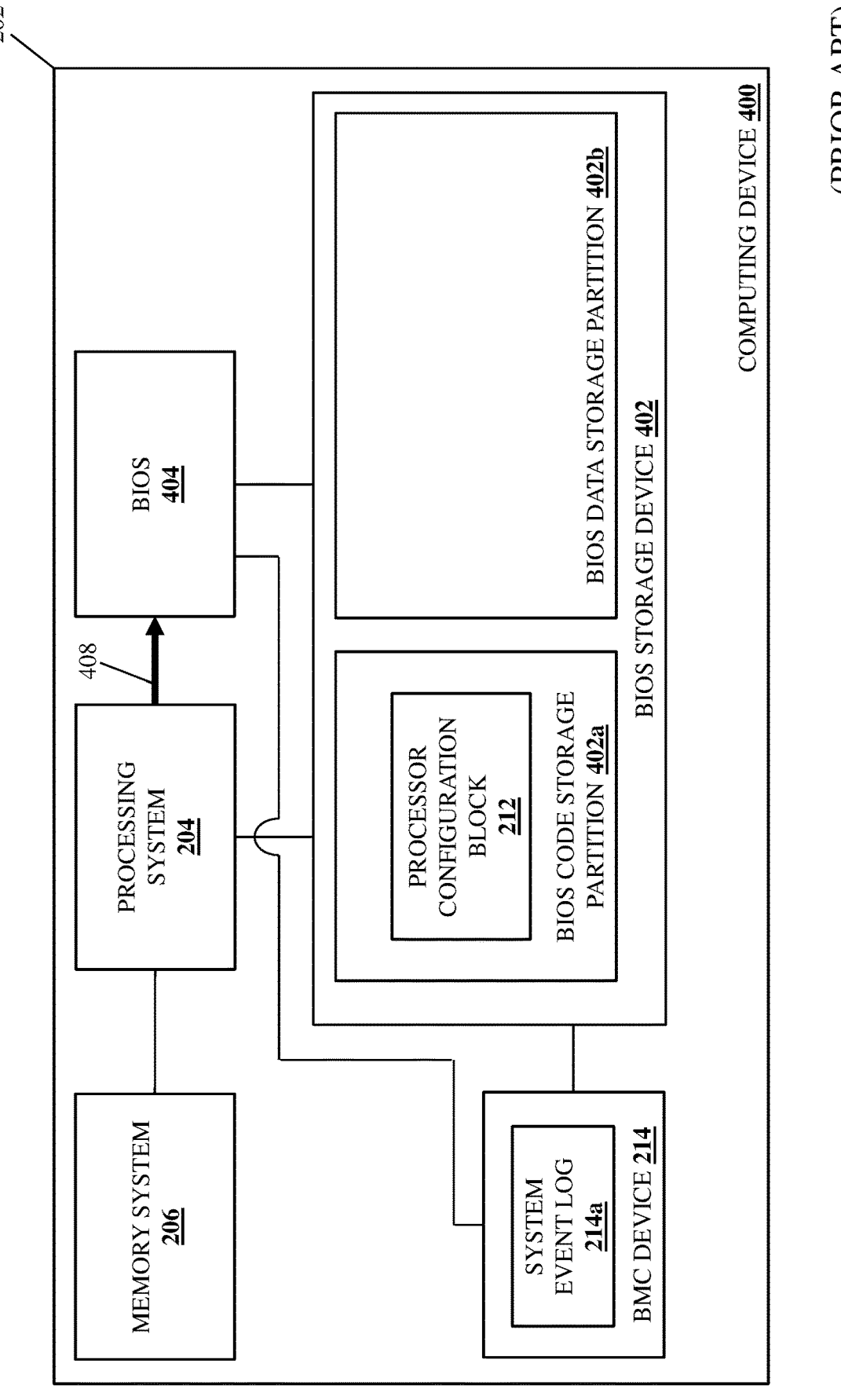
FIG. 4C is a schematic view illustrating an embodiment of the conventional computing device of FIG. 4A performing operations associated with the conventional modification of a BIOS code storage subsystem in the conventional computing device.
Figure 4D:
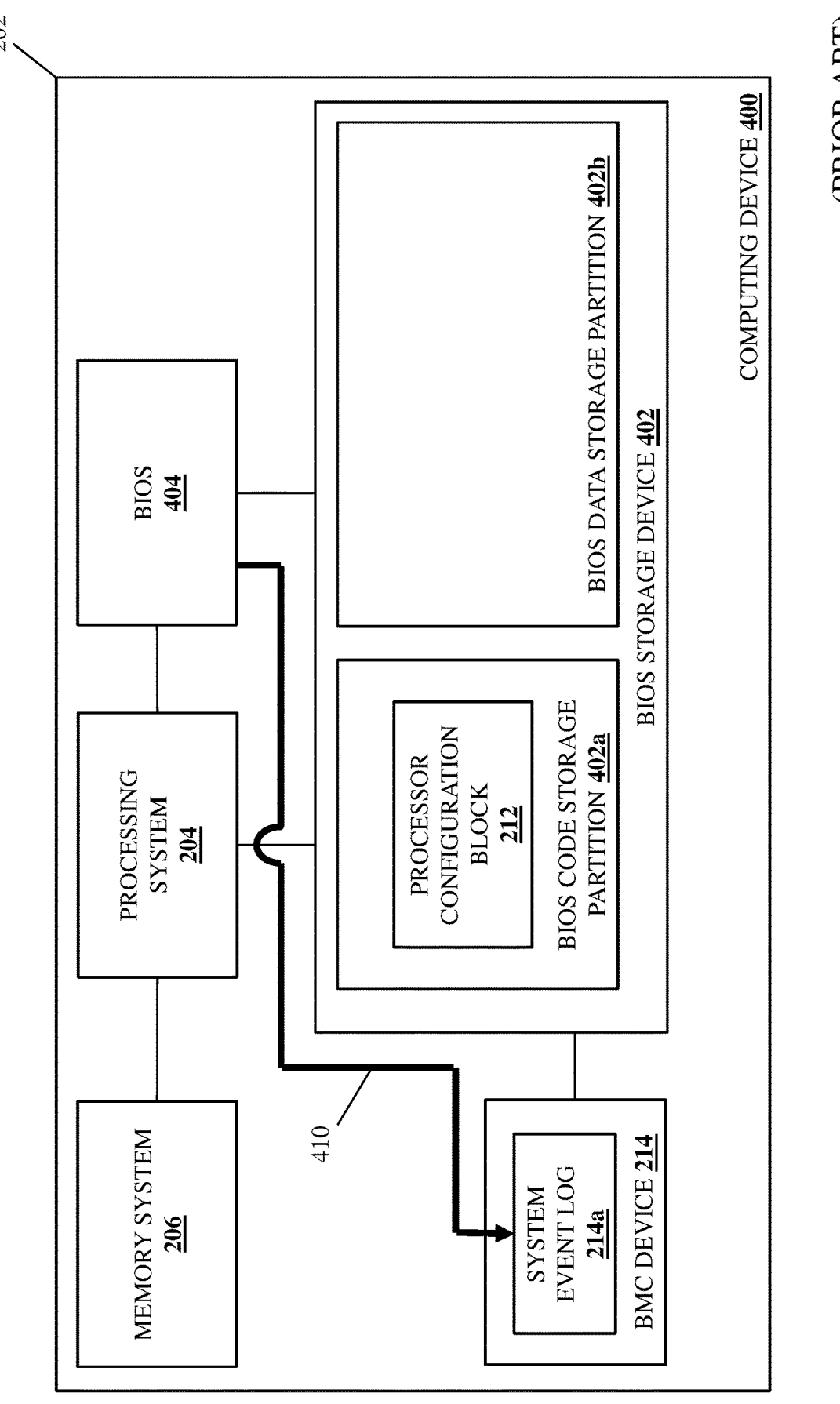
FIG. 4D is a schematic view illustrating an embodiment of the conventional computing device of FIG. 4A performing operations associated with the conventional modification of a BIOS code storage subsystem in the conventional computing device.

With reference to FIG. 4C, during the runtime operations of the conventional computing device 400, the processing system 204 in the conventional computing device 400 then performs interrupt operations 408 that include generating and transmitting a System Management Interrupt (SMI) to the BIOS 404, which one of skill in the art in possession of the present disclosure will appreciate may cause the conventional computing device 400 to enter a System Management Mode (SMM) during its runtime. With reference to FIG. 4D, during runtime operations of the conventional computing device 400 and while the conventional computing device 400 is in the SMM, the BIOS 404 performs logging operations 410 that include logging the memory device issue (e.g., a memory error) in the System Event Log (SEL) in the BMC device 214.

Figure 4E:
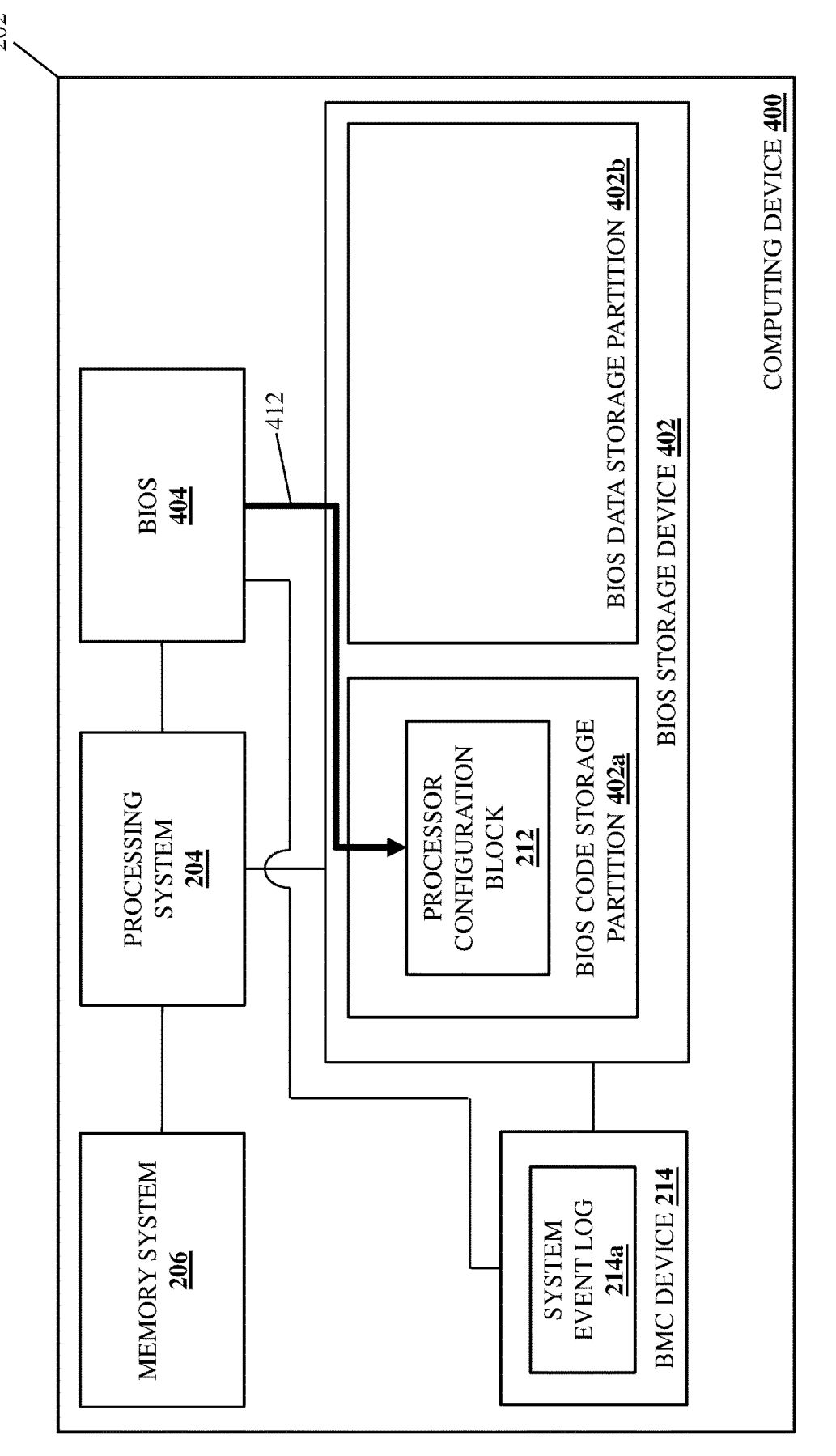
FIG. 4E is a schematic view illustrating an embodiment of the conventional computing device of FIG. 4A conventionally modifying a BIOS code storage subsystem in the conventional computing device.

With reference to FIG. 4E, during runtime operations of the conventional computing device 400 the BIOS 404 then performs memory repair scheduling operations 412 that include accessing the BIOS storage device 402 and scheduling a memory repair operation (e.g., a Post Package Repair (PPR) operation) by modifying the processor configuration block 212 (e.g., the AGESA APCB structure discussed above) in the BIOS code storage partition 402a with memory repair scheduling information. As will be appreciated by one of skill in the art in possession of the present disclosure, the accessing of the BIOS storage device 402 to perform the memory repair scheduling operations 412 includes the BIOS 404 taking control of the communication bus to the BIOS storage device 402 as a "bus master". Furthermore, one of skill in the art in possession of the present disclosure will appreciate how the memory repair scheduling operations 412 performed by the BIOS 404 may be a relatively time-consuming operation. For example, the modification of the AGESA APCB structure that may provide the processor configuration block 212 in the BIOS code storage partition 402a requires that the BIOS 404 provide the memory repair scheduling information in the AGESA APCB structure via firmware in the processing system 204 (e.g., AMD® processor firmware in an AMD® processing system) that operates as a "middle man" that extends the amount of time needed modify the AGESA APCB structure in the BIOS code storage partition 402a.

Figure 4G:
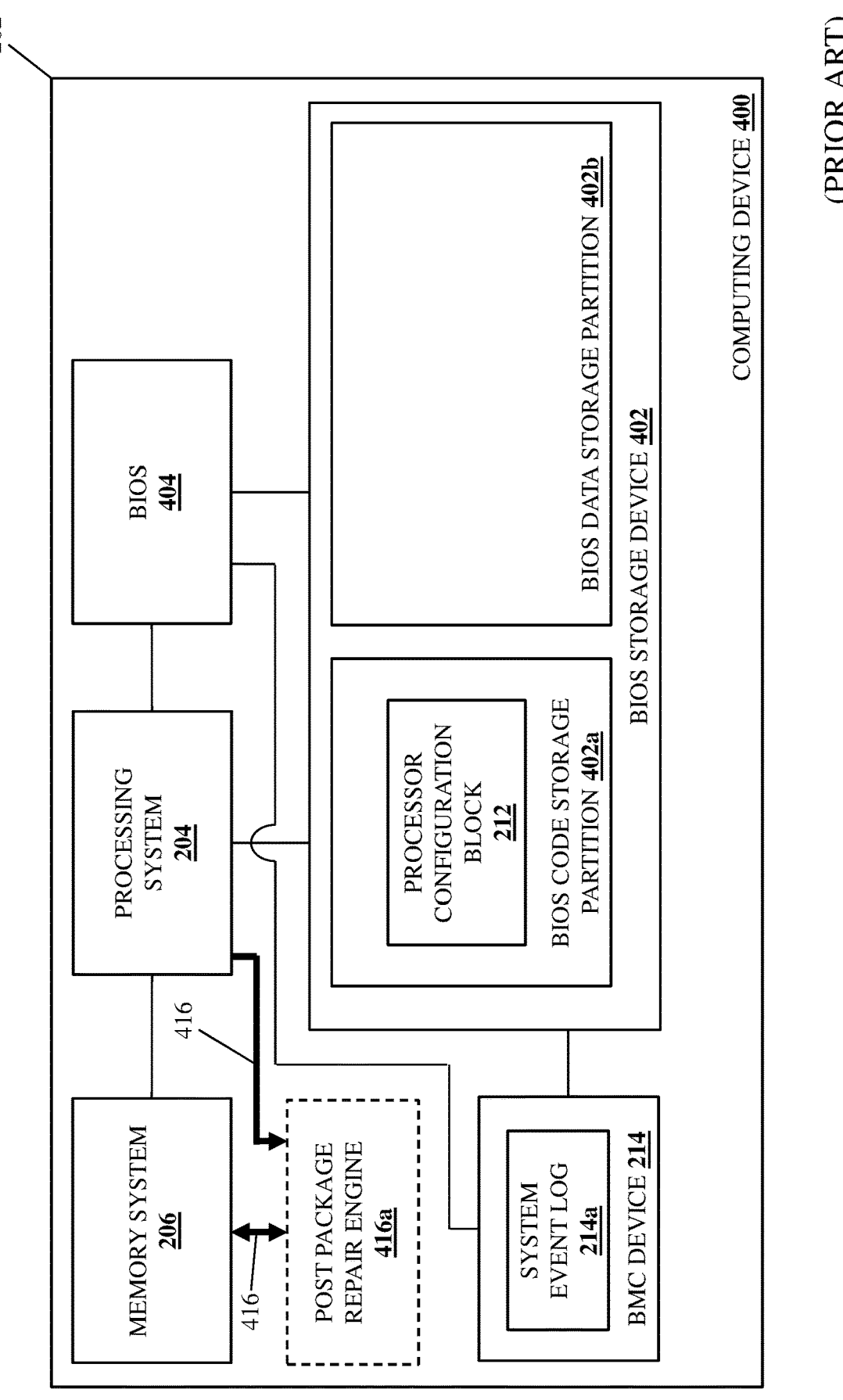
FIG. 4G is a schematic view illustrating an embodiment of the conventional computing device of FIG. 4A performing operations using information from a conventionally modified BIOS code storage subsystem in the conventional computing device.

Subsequently, the conventional computing device 400 may be reset, rebooted, and/or otherwise initialized (e.g., by a user, via a schedule, etc.) following the runtime operations discussed above, and during the initialization of the conventional computing device 400 the processing system 204 may perform BIOS code storage partition access operations 414 that include accessing the processor configuration block 212 and identifying the memory repair scheduling information provided therein by the BIOS 404 as described above, as illustrated in FIG. 4F. With reference to FIG. 4G, during the initialization of the conventional computing device 400 and in response to identifying the memory repair scheduling information, the processing system 204 may perform memory repair operations 416 that include providing a PPR engine 416a that operates to attempt to repair the unavailable memory device in the memory system 206.

As discussed above, the conventional BIOS code storage subsystem modification system in the conventional computing device 400 discussed above is subject to issues during its operations. For example, with reference to FIG. 4H, the BMC device 214 may be configured to periodically perform BIOS code storage partition access operations 418 that include accessing the BIOS code storage partition 402a in the BIOS storage device 402 during runtime of the conventional computing device 400. For example, during runtime of the computing device 400, the BIOS code storage partition access operations 418 performed by the BMC device 214 may be configured to access (e.g., scan) the BIOS storage device 402, and verify the integrity of the BIOS code stored in the BIOS code storage partition 402a (e.g., by hashing that BIOS code to generate a hash value and comparing that hash value to a "golden" hash value associated with known/trusted BIOS code).

As will be appreciated by one of skill in the art in possession of the present disclosure, the performance of the BIOS code storage partition access operations 418 to access the BIOS storage device 402 includes the BIOS 404 taking control of the communication bus to the BIOS storage device 402 as a "bus master". However, in the event the BMC device 214 has taken control of the communication bus to the BIOS storage device 402 as the "bus master" in order to perform the BIOS code storage partition access operations 418, and the BIOS 404 then attempts to schedule the memory repair operations (e.g., by modifying the AGESA APCB structure in the BIOS code storage partition 402a), the conventional computing device 400 will "freeze", "hang", or otherwise become unavailable due to the inability of the BIOS 404 to access the BIOS storage device 402 (i.e., because the communication bus to the BIOS storage device 402 can only support one "bus master" (i.e., the BMC device 214 in this example) at a time). Similarly, in the event the BIOS 404 has taken control of the communication bus to the BIOS storage device 402 as the "bus master" in order to perform the memory repair scheduling operations 412, and the BMC device 214 attempts to perform BIOS code storage partition access operations 418, the BMC device 214 may "freeze", "hang", or otherwise become unavailable due to the inability of the BMC device 214 to access the BIOS storage device 402 (i.e., because the communication bus to the BIOS storage device 402 can only support one "bus master" (i.e., the BIOS 404 in this example) at a time).

As discussed below, the BIOS code storage subsystem modification system of the present disclosure prevents the issues associated with conventional BIOS code storage subsystem modification systems discussed above by preventing the possibility that both the BIOS and the BMC device will attempt to access the BIOS code storage subsystem at the same time via the use of separate a BIOS code storage device and BIOS data storage device that allow the BIOS to schedule BIOS code storage device modifications in the BIOS data storage device during runtime of their computing device, and then perform those BIOS code storage device modifications during initialization of their computing device such that those BIOS code storage device modifications will not be prevented due to accesses of the BIOS code storage device by the BMC device in the computing device during its runtime. The operation of the BIOS code storage subsystem modification system of the present disclosure will now be described with regard to the modification of the BIOS code storage device 210*a* in response to a memory system issue, but one of skill in the art in possession of the present disclosure will appreciate how the BIOS code storage subsystem modification system of the present disclosure may be utilized to modify the BIOS code storage device 210*a* for other reasons that will fall within the scope of the present disclosure as well.

Figure 5A:
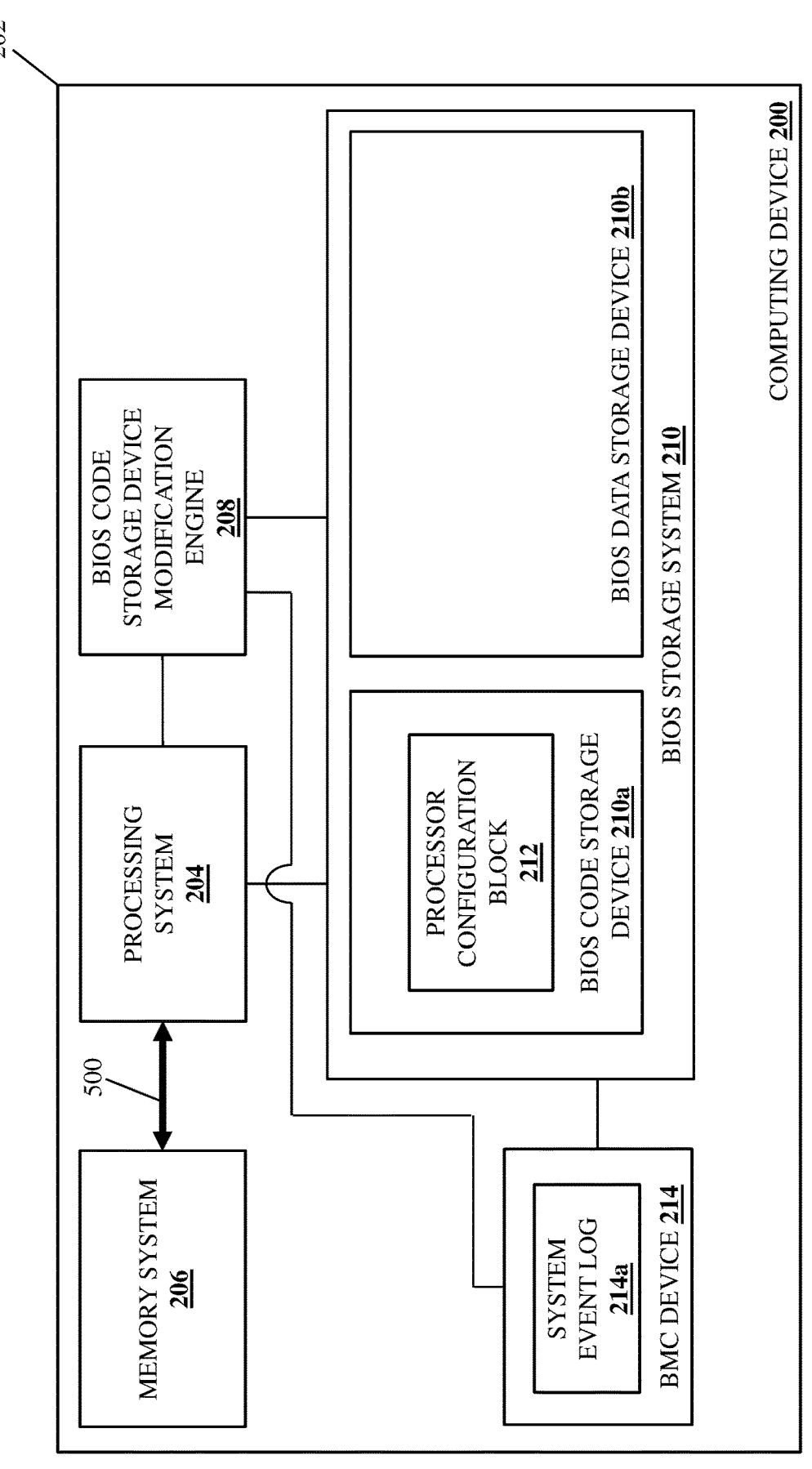
FIG. 5A is a schematic view illustrating an embodiment of the computing device of FIG. 2 operating during the method of FIG. 3.

The method 300 may begin at optional block 302 where a processing system detects a memory system issue. With reference to FIG. 5A, in an embodiment of optional block 302 and during runtime operations of the computing device 200 (e.g., when an operating system provided in the computing device 200 controls the computing device 200), the processing system 204 in the computing device 200 may perform memory system analysis operations 500 that include analyzing the memory system 206 and identifying a "bad", failing, or otherwise unavailable memory device in the memory system 206 (e.g., via the detection of correctable and uncorrectable errors in that memory device).

Figure 5B:
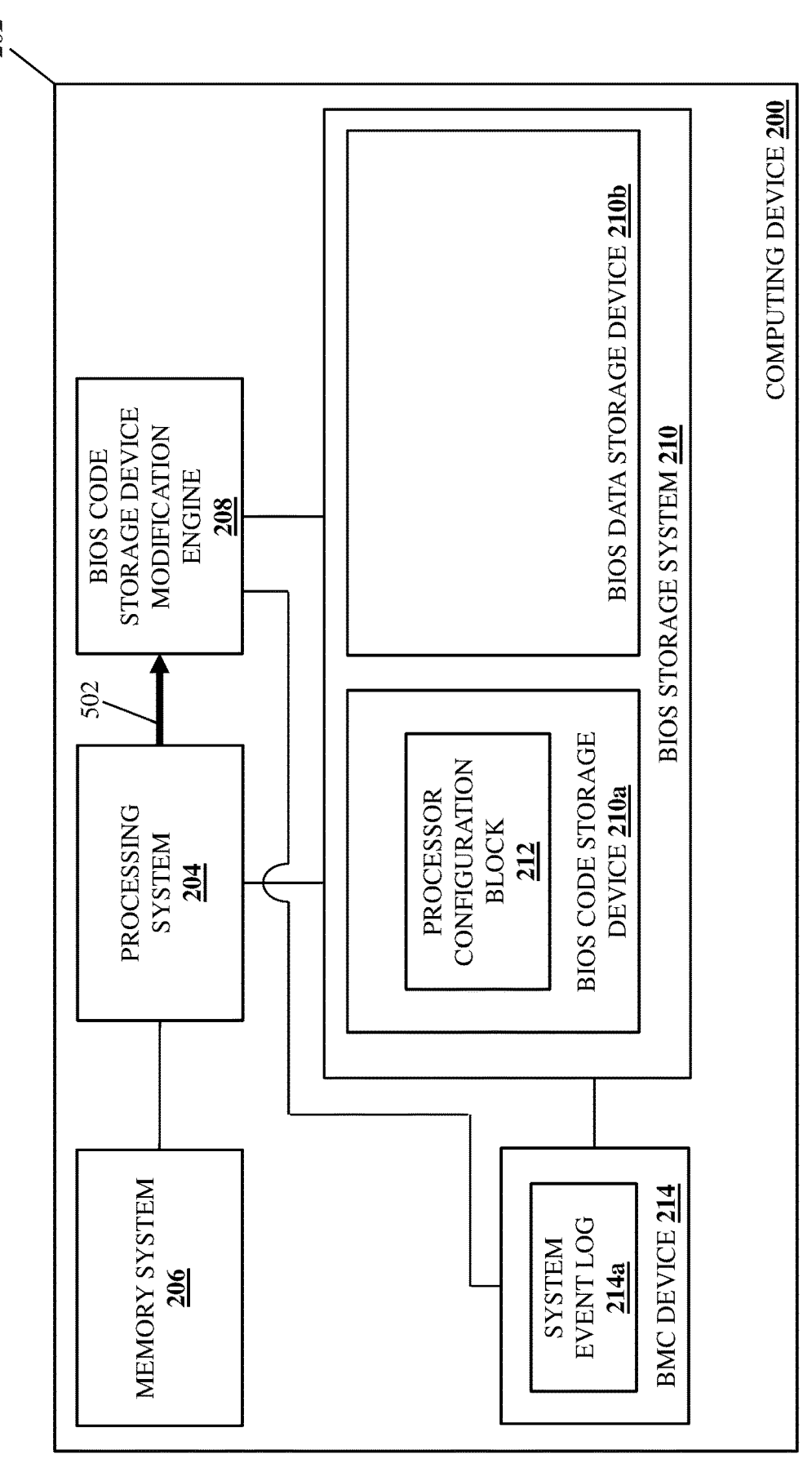
FIG. 5B is a schematic view illustrating an embodiment of the computing device of FIG. 2 operating during the method of FIG. 3.

The method 300 then proceeds to block 304 where the processing system provides an interrupt to a BIOS code storage device modification subsystem. With reference to FIG. 5B, in an embodiment of block 304 and during the runtime operations of the computing device 200, the processing system 204 in the computing device 200 may then perform interrupt operations 502 that may include generating and transmitting a System Management Interrupt (SMI) to the BIOS code storage device modification engine 208 in the computing device 200, which one of skill in the art in possession of the present disclosure will appreciate may cause the computing device 200 to enter a System Management Mode (SMM) during its runtime. As will be appreciated by one of skill in the art in possession of the present disclosure, the interrupt at block 304 may be provided by the BIOS in the computing device 200 that provides the BIOS code storage device modification engine 208 to cause the computing device 200 to enter the SMM, while in other embodiments the interrupt at block 304 may be provided by an operating system or other application running in the computing device 200 provides the BIOS code storage device modification engine 208 (e.g., the operating system or other application may provide the interrupt by calling Universal Extensible Firmware Interface (UEFI) variable services to invoke a "soft" SMI, or using other techniques that would be apparent to one of skill in the art in possession of the present disclosure). However, while the interrupt is illustrated and described as being generated and transmitted at block 304 in response to a memory unavailability or other issue, one of skill in the art in possession of the present disclosure will appreciate how the interrupt may be generated and transmitted for a variety of reasons that will fall within the scope of the present disclosure as well.

Figure 5C:
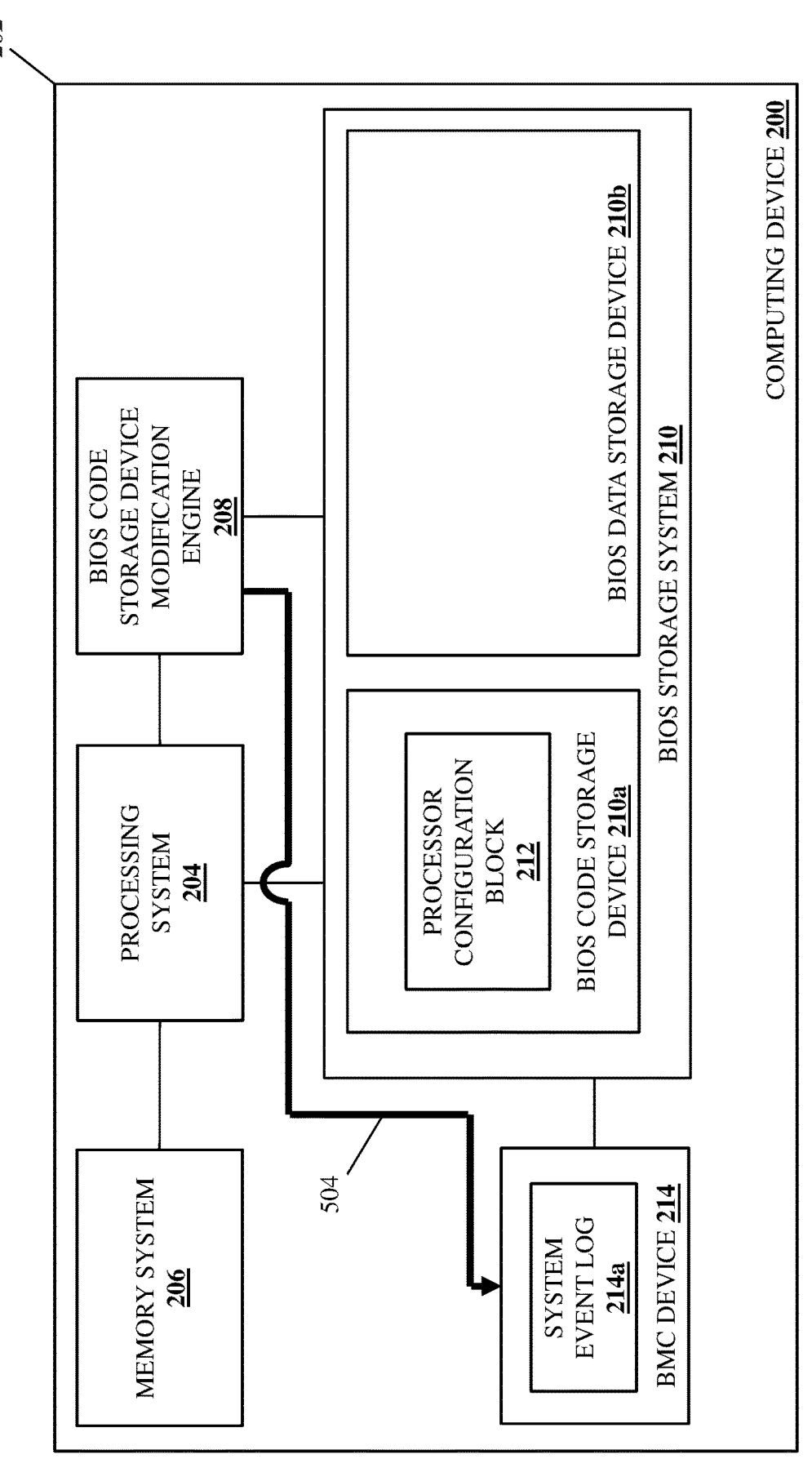
FIG. 5C is a schematic view illustrating an embodiment of the computing device of FIG. 2 operating during the method of FIG. 3.

The method 300 may then proceed to optional block 306 where the BIOS code storage device modification subsystem logs the memory system issue. With reference to FIG. 5C, in some embodiments of optional block 306 and during runtime operations of the computing device 200 and while the computing device 200 is in the SMM, the BIOS in the computing device 200 that provides the BIOS code storage device modification engine 208 may perform logging operations 504 that include logging the memory device issue (e.g., a memory error) in the System Event Log (SEL) in the BMC device 214. However, one of skill in the art in possession of the present disclosure will appreciate how the BIOS code storage device modification operations described below may be performed without the logging operations described above while remaining within the scope of the present disclosure as well.

Figure 5D:
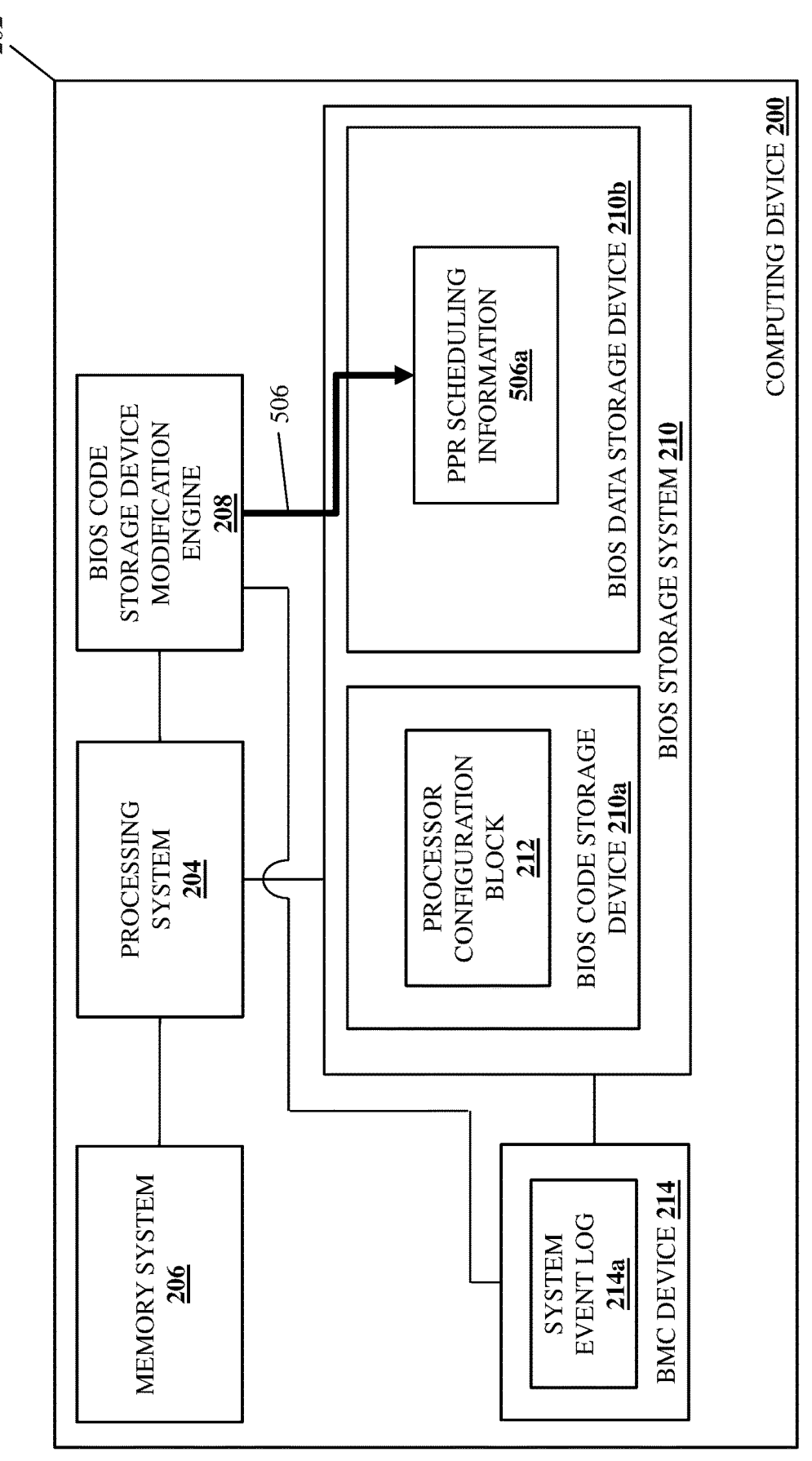
FIG. 5D is a schematic view illustrating an embodiment of the computing device of FIG. 2 operating during the method of FIG. 3.

The method 300 then proceeds to block 308 where the BIOS code storage device modification subsystem provides BIOS code storage device modification information in a BIOS data storage device. With reference to FIG. 5D, in an embodiment of block 308 and during runtime operations of the computing device 200 and while the computing device 200 is in the SMM, the BIOS code storage device modification engine 208 may perform BIOS code storage device modification information provisioning operations 506 that include accessing the BIOS data storage device 210*b* in the BIOS storage system 210 and providing (e.g., writing) BIOS code storage device modification information in the BIOS data storage device 210*b*. As will be appreciated by one of skill in the art in possession of the present disclosure, in embodiments in which an operating system or other application running in the computing device 200 provides the BIOS code storage device modification engine 208, the operating system or other application may provide (e.g., write) the BIOS code storage device modification information in the BIOS data storage device 210*b* by writing a variable in the BIOS data storage device 210*b* (e.g., following the calling of UEFI variable services to invoke the "soft" SMI as discussed above), and one of skill in the art in possession of the present disclosure will appreciate how that variable may be standardized to provide the functionality described below across different operating systems or applications.

As illustrated in FIG. 5D, and continuing with the specific example provided above, the BIOS code storage device modification information provisioning operations 506 may include providing PPR scheduling information 506*a* or other memory repair scheduling information in the BIOS data storage device 210*b*, and one of skill in the art in possession of the present disclosure will appreciate that the PPR scheduling information 506*a* or other memory repair scheduling information may include any information required to schedule the PPR operations/memory repair operations as described below. However, while the BIOS code storage device modification information is illustrated and described as providing for the scheduling of PPR operations/memory repair operations, one of skill in the art in possession of the present disclosure will appreciate how BIOS code storage device modification information may include any information that may be used to modify the BIOS code storage device 210*a* while remaining within the scope of the present disclosure.

As will be appreciated by one of skill in the art in possession of the present disclosure, the accessing of the BIOS data storage device 210*b* to perform the BIOS code storage device modification information provisioning operations 506 includes the BIOS code storage device modification engine 208 taking control of the communication bus to the BIOS data storage device 210*b* as a "bus master". Furthermore, one of skill in the art in possession of the present disclosure will appreciate how the BIOS code storage device modification information provisioning operations 506 performed by the BIOS code storage device modification engine 208 are relatively less time-consuming operation compared to the memory repair scheduling operations 412 performed by the BIOS 404 in the conventional BIOS code storage subsystem modification system described above, as the BIOS code storage device modification engine 208 may provide (e.g., write) the BIOS code storage device modification information directly in the BIOS data storage device 210*b* (as opposed to the transmission of the memory repair scheduling information via firmware in the processing system 204 to the BIOS code storage partition 402*a* as described above). For example, in experimental embodiments involving the PPR scheduling described in some of the specific examples provided herein, the BIOS code storage device modification information provisioning operations 506 have been measured to consume ~24 milliseconds as compared to ~130 ms for the memory repair scheduling operations 412, thus reducing the amount of time the computing device 200 spends in SMM to schedule PPR operations as compared to the conventional computing device 400.

Figure 5E:
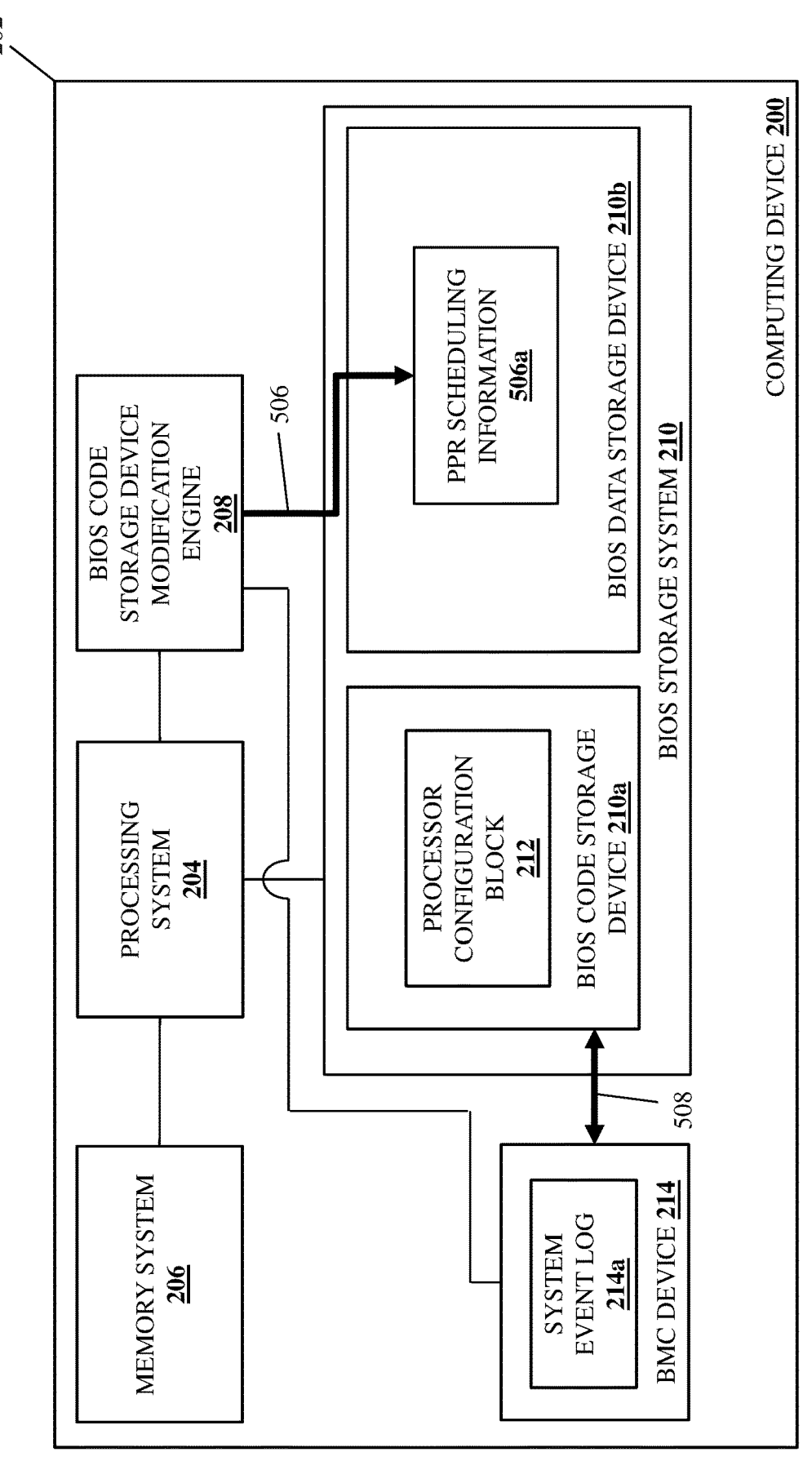
FIG. 5E is a schematic view illustrating an embodiment of the computing device of FIG. 2 operating during the method of FIG. 3.

With reference to FIG. 5E, similarly as discussed above, the BMC device 214 may be configured to periodically perform BIOS code storage device access operations 508 that include accessing the BIOS code storage device 210*a* in the BIOS storage system 210. As such, the BIOS code storage device access operations 508 performed by the BMC device 214 may be configured to access (e.g., scan) the BIOS code storage device 210*a*, and verify the integrity of the BIOS code stored in the BIOS code storage device 210*a* (e.g., by hashing that BIOS code to generate a hash value and comparing that hash value to a "golden" hash value associated with known/trusted BIOS code).

As will be appreciated by one of skill in the art in possession of the present disclosure, the performance of the BIOS code storage device access operations 508 to access the BIOS code storage device 210*a* includes the BMC device 214 taking control of the communication bus to the BIOS code storage device 210*a* as a "bus master". Furthermore, because the BIOS code storage device 210*a* and the BIOS data storage device 210*b* are separate storage devices that each include its own dedicated communication bus, the BMC device 214 may take control of the communication bus to the BIOS code storage device 210*a* as the "bus master" in order to perform the BIOS code storage partition access operations 508 while the BIOS 404 takes control of the communication bus to the BIOS data storage device 210*b* as the "bus master" in order to perform the BIOS code storage device modification information provisioning operations 506 without causing the computing device 400 to "freeze", "hang", or otherwise become unavailable as occurs in the conventional BIOS code storage subsystem modification system as described above.

The method 300 then proceeds to block 310 where the BIOS code storage device modification subsystem causes a reboot. In an embodiment, at block 310 and subsequent to the BIOS code storage device modification information being provided in the BIOS data storage device 210*b*, the computing device 200 may be reset, rebooted, and/or otherwise initialized (e.g., by a user, via a schedule, etc.) following the runtime operations discussed above. As will be appreciated, the computing device 200 may then begin "first" initialization operations (e.g., a Power-on Start-Up (POST)) that provide for initialization of the computing device 200 a first time following the runtime operations at blocks 302-308 discussed above. Continuing with the specific example provided above, any BIOS code storage subsystem access operations performed by the processing system 204 that include accessing the processor configuration block 212 during the "first" initialization (e.g., the BIOS code storage partition access operations 414 discussed above) will not identify any BIOS code storage device modifications (e.g., the memory repair scheduling information discussed above) in the BIOS code storage device 210*a* (e.g., the processor configuration block 212) at this point in the method 300.

Figure 5F:
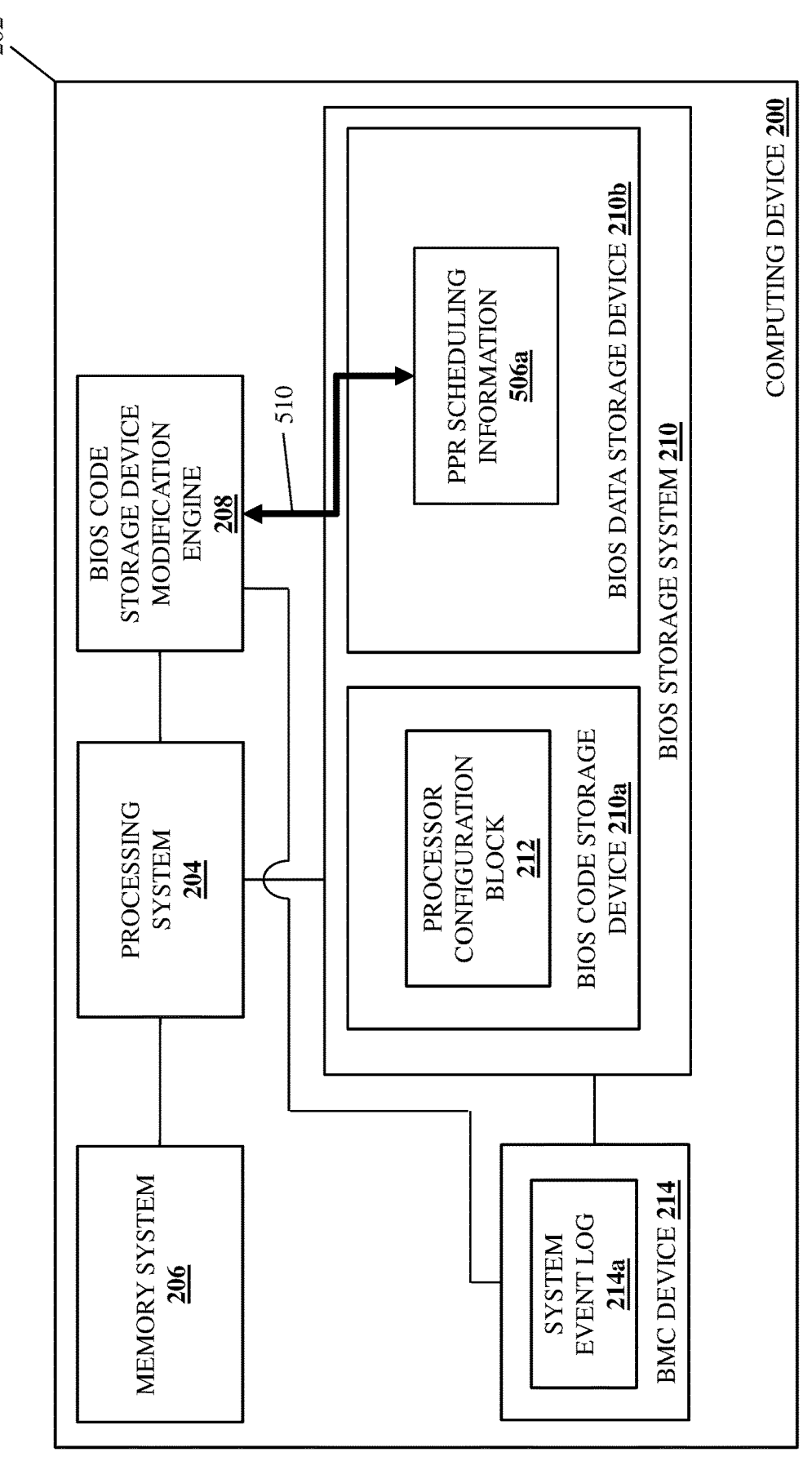
FIG. 5F is a schematic view illustrating an embodiment of the computing device of FIG. 2 operating during the method of FIG. 3.

The method 300 then proceeds to block 312 where the BIOS code storage device modification subsystem identifies the BIOS code storage device modification information in the BIOS data storage device. With reference to FIG. 5F, in an embodiment of block 312 and during the "first" initialization of the computing device 200, the BIOS code storage device modification engine 208 may perform BIOS code storage device modification information identification operations 510 that include accessing the BIOS data storage device 210*b* and identifying the BIOS code storage device modification information that was provided in the BIOS data storage device 210*b* at block 308. As will be appreciated by one of skill in the art in possession of the present disclosure, a BIOS in the computing device 200 may perform the BIOS code storage device modification information identification operations 510 of the BIOS code storage device modification engine 208 during the "first" initialization of the computing device 200 at block 312.

Figure 5G:
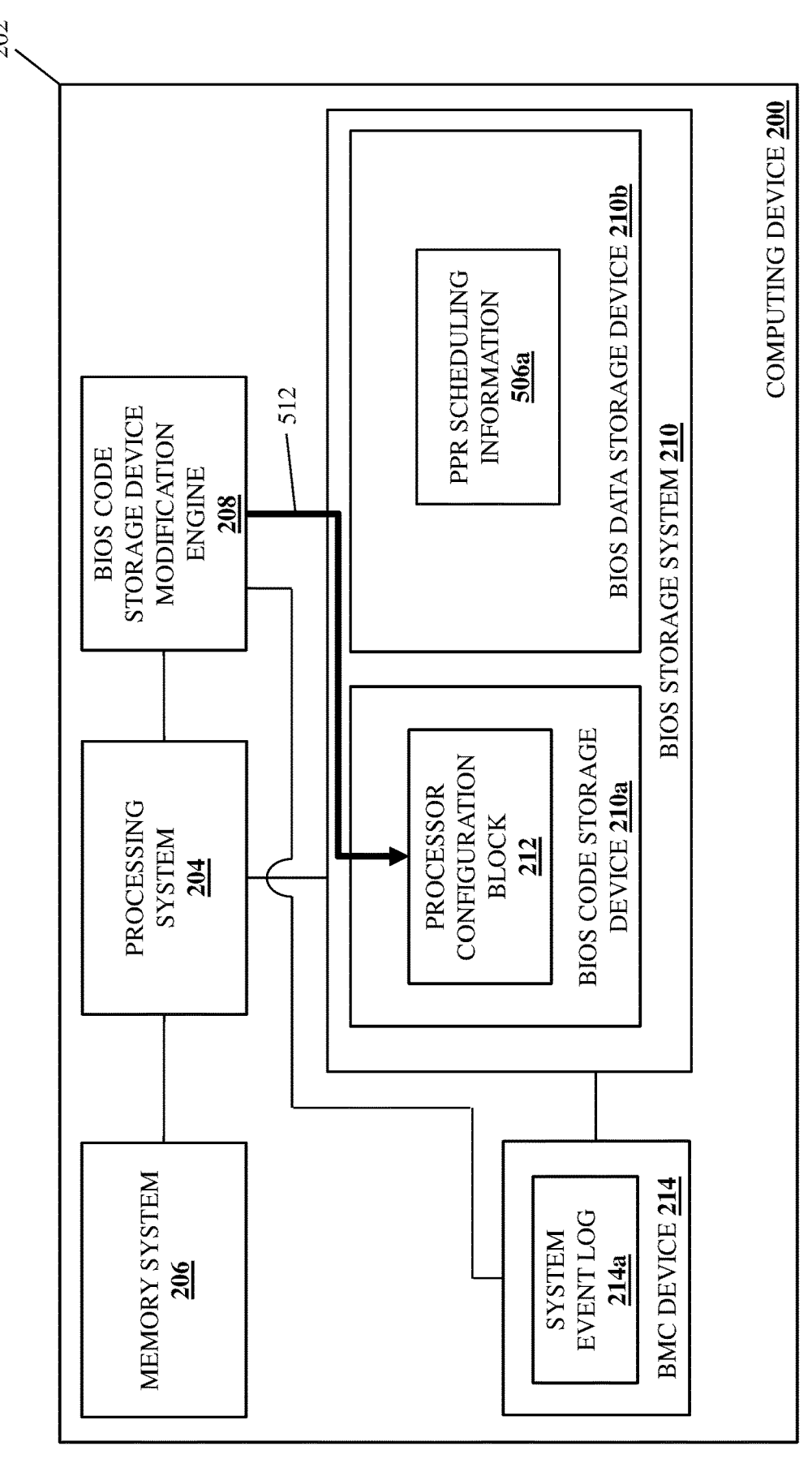
FIG. 5G is a schematic view illustrating an embodiment of the computing device of FIG. 2 operating during the method of FIG. 3.

The method 300 then proceeds to block 314 where the BIOS code storage device modification subsystem uses the BIOS code storage device modification information to modify a BIOS code storage device during initialization. With reference to FIG. 5G, in an embodiment of block 314 and during the "first" initialization of the computing device 200, the BIOS code storage device modification engine 208 may perform BIOS code storage device modification operations 512 that include accessing the BIOS code storage device 210*a* and using the BIOS code storage device modification information to modify the BIOS code storage device 210*a*.

Continuing with the specific example provided above, FIG. 5G illustrates how the BIOS code storage device modification operations 512 may include accessing the BIOS code storage device 210*a* and using the PPR scheduling information 506*a* or other memory repair scheduling information that provides the BIOS code storage device modification information to schedule a memory repair operation (e.g., a Post Package Repair (PPR) operation) by modifying the processor configuration block 212 (e.g., the AGESA APCB structure discussed above) in the BIOS code storage device 210*a* with the PPR scheduling information 506*a*. As will be appreciated by one of skill in the art in possession of the present disclosure, a BIOS in the computing device 200 may perform the BIOS code storage device modification operations 512 of the BIOS code storage device modification engine 208 during the "first" initialization of the computing device 200 at block 314.

As will be appreciated by one of skill in the art in possession of the present disclosure, the accessing of the BIOS code storage device 210*a* by the BIOS code storage device modification engine 208 (by the taking control of the communication bus to the BIOS code storage device 210*a* as a "bus master") does not introduce any of the issues associated with the conventional BIOS code storage subsystem modification systems discussed above, as the BIOS in the computing device 200 that performs the BIOS code storage device modification operations 512 of the BIOS code storage device modification engine 208 during the initialization of the computing device 200 at block 314 has full control of the BIOS code storage device 210*a* during the initialization of the computing device 200, and components in the computing device 200 may be configured to not access (or may be incapable of accessing) the BIOS code storage device 210 during the initialization of the computing device 200 (e.g., the BMC device 214 may be configured to perform the BIOS code integrity verification operations discussed above only during runtime of the computing device 200 that follows its initialization).

Figure 5H:
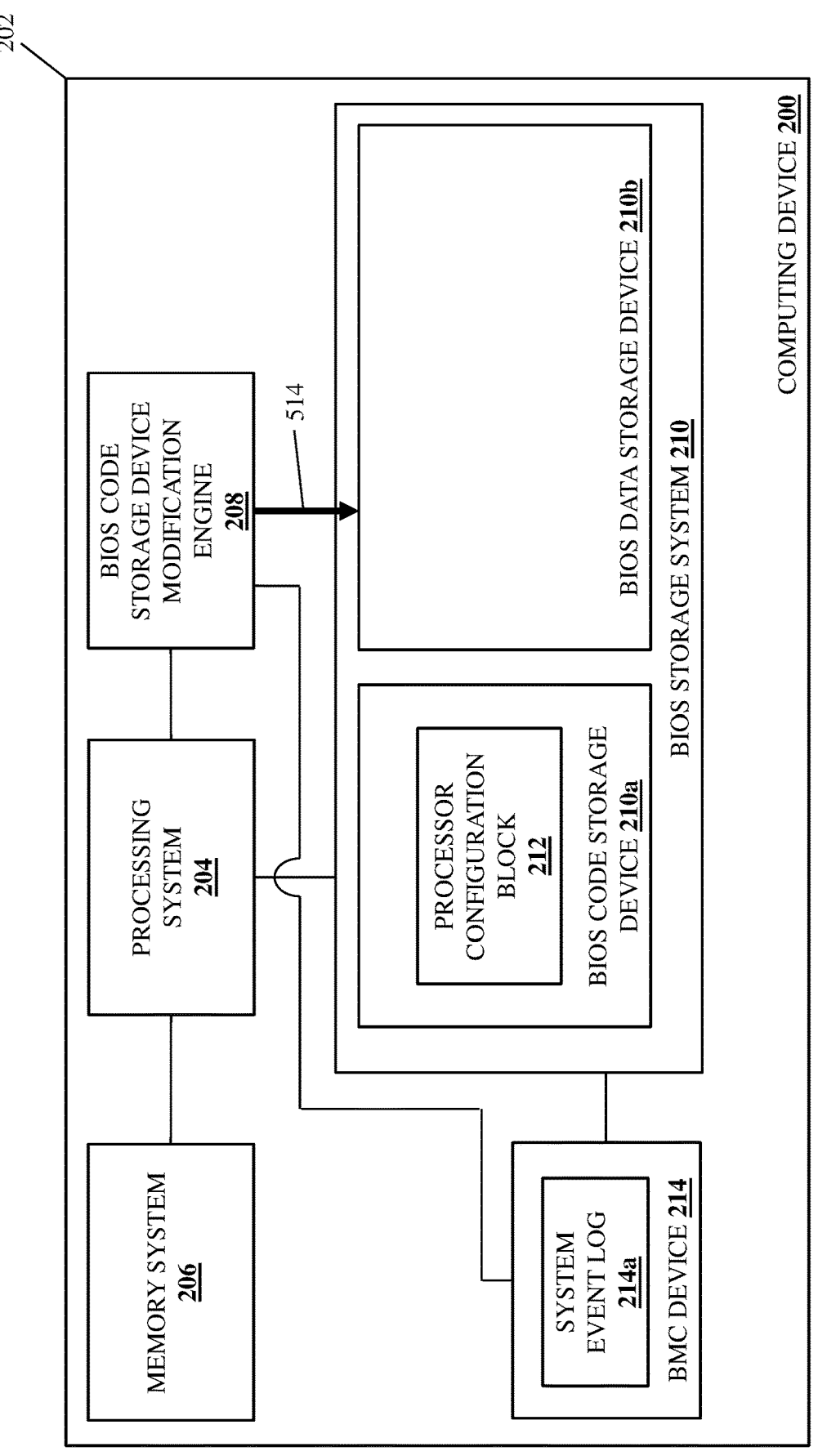
FIG. 5H is a schematic view illustrating an embodiment of the computing device of FIG. 2 operating during the method of FIG. 3.

The method 300 then proceeds to block 316 where the BIOS code storage device modification subsystem erases the BIOS code storage device modification information from the BIOS data storage device during initialization. With reference to FIG. 5H, in an embodiment of block 316 and during the "first" initialization of the computing device 200, the BIOS code storage device modification engine 208 may perform BIOS code storage device modification information erase operations 514 that include accessing the BIOS data storage device 210b and erasing the BIOS code storage device modification information from the BIOS data storage device 210b, which one of skill in the art in possession of the present disclosure will appreciate will prevent that BIOS code storage device modification information from being used on a subsequent initialization of the computing device 200 to modify the BIOS code storage device 210a. As will be appreciated by one of skill in the art in possession of the present disclosure, a BIOS in the computing device 200 may perform the BIOS code storage device modification information erase operations 514 of the BIOS code storage device modification engine 208 during the "first" initialization of the computing device 200 at block 316.

The method 300 may then proceed to optional block 318 where the BIOS code storage device modification subsystem causes a reboot. In an embodiment, at optional block 318 and subsequent to the modification of the BIOS code storage device 210a, the computing device 200 may be reset, rebooted, and/or otherwise initialized (e.g., by a user, via a schedule, automatically by the BIOS in the computing device 200 that provides the BIOS code storage device modification engine 208, etc.). As will be appreciated, the computing device 200 may then begin "second" initialization operations (e.g., a Power-on Start-Up (POST)) that provide for initialization of the computing device 200 a second time following the runtime operations at blocks 302-308 and the "first" initialization discussed above.

Figure 5I:
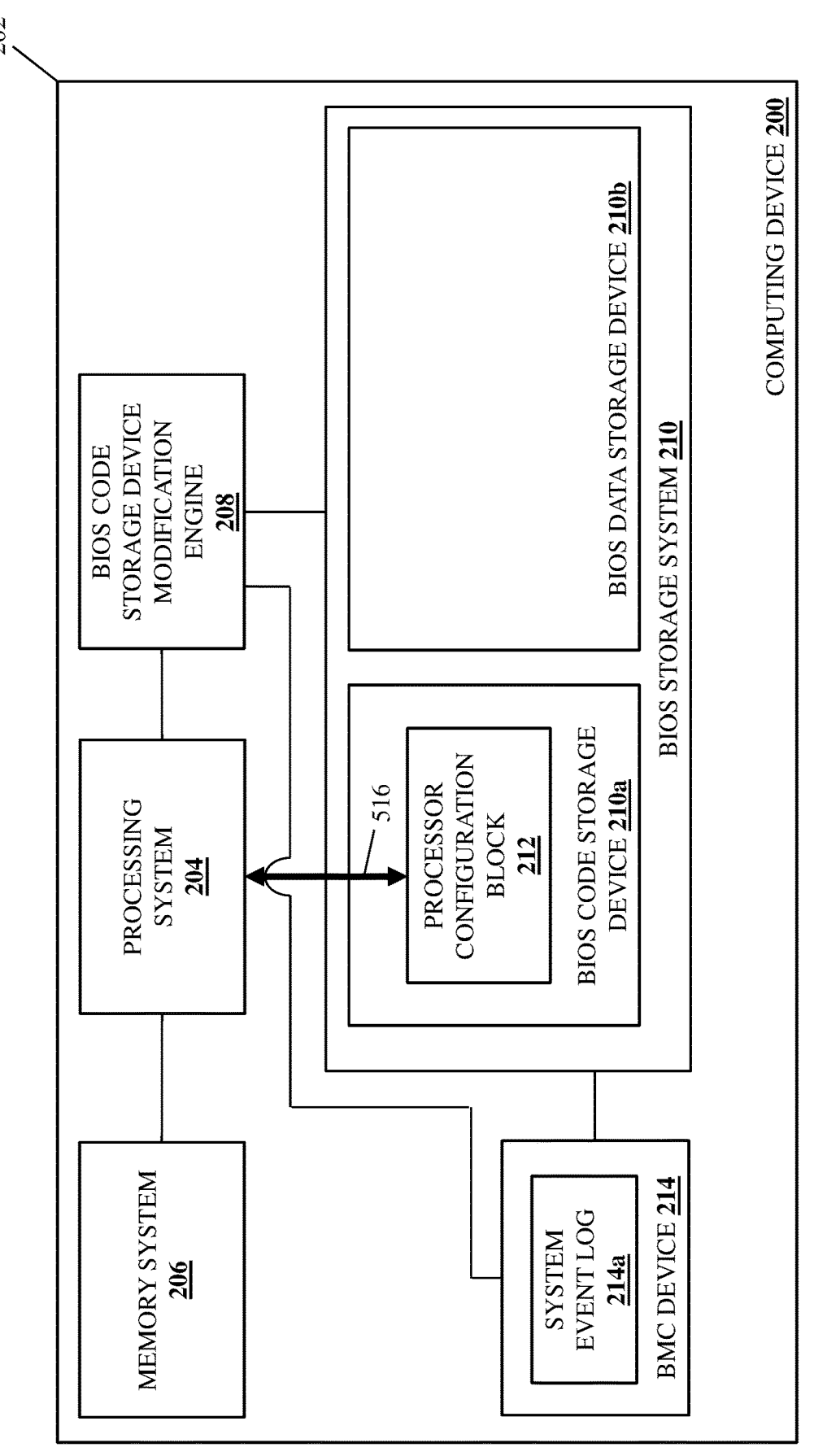
FIG. 5I is a schematic view illustrating an embodiment of the computing device of FIG. 2 operating during the method of FIG. 3.

The method 300 may then proceed to optional block 320 where the processing system identifies the BIOS code storage device modification information in the BIOS code storage device during initialization. With reference to FIG. 5I, in an embodiment of optional block 320 and during the "second" initialization of the computing device 200, the processing system 204 in the computing device 200 may perform BIOS code storage device access operations 516 that include accessing the processor configuration block 212 (e.g., the AGESA APCB structure discussed above) in the BIOS code storage device 210a and identifying the memory repair operation that was scheduled therein as part of the modification of the BIOS code storage device 210a as described above.

Figure 5J:
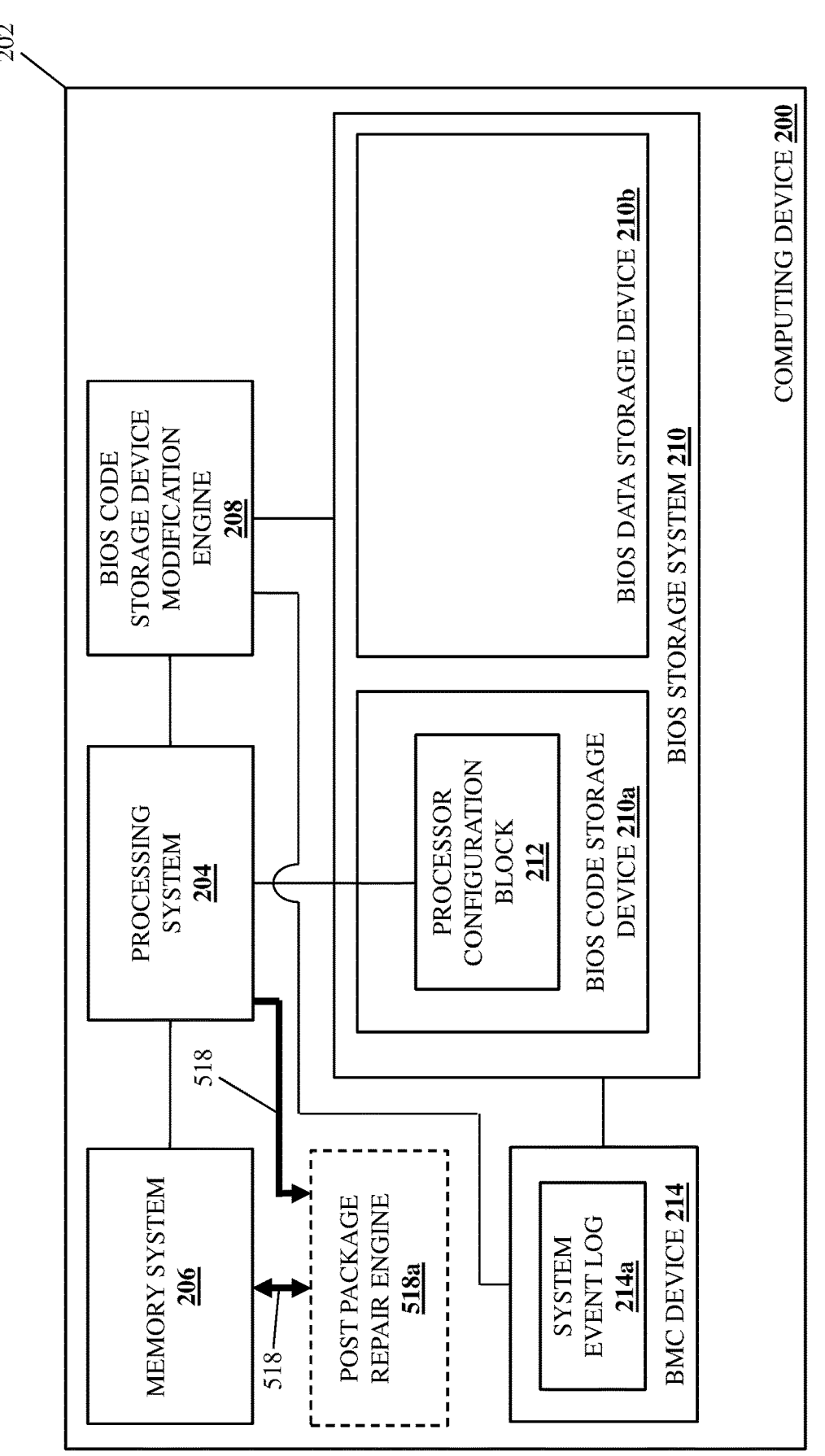
FIG. 5J is a schematic view illustrating an embodiment of the computing device of FIG. 2 operating during the method of FIG. 3.

The method 300 may then proceeds to optional block 322 where the BIOS code storage device modification subsystem uses the BIOS code storage device modification information to perform operations during initialization. With reference to FIG. 5J, in an embodiment of optional block 322 and during the "second" initialization of the computing device 200 and in response to identifying that the memory repair operation was scheduled, the processing system 204 may perform memory repair operations 518 that include providing a PPR engine 518a that operates to attempt to repair the unavailable memory device in the memory system 206.

Thus, systems and methods have been described that provide a BIOS storage system in a computing device having BIOS data storage device that is separate from a BIOS code storage device, store BIOS code storage device modification information in the BIOS data storage device during runtime of the computing device, and then use that BIOS code storage device modification information to update the BIOS code storage device on a subsequent initialization of the computing device. For example, the BIOS code storage subsystem modification system of the present disclosure may include a computing device having BIOS code storage device modification subsystem coupled to a BIOS storage system that includes a BIOS code storage device and a BIOS data storage device. The BIOS code storage device modification subsystem receives a BIOS code storage device modification interrupt and, in response, provides BIOS code storage device modification information in the BIOS data storage device. Subsequent to providing the BIOS code storage device modification information in the BIOS data storage device, the BIOS code storage device modification subsystem causes the computing device to perform a first reboot. During a first initialization of the computing device in response to the first reboot, a BIOS in the computing device identifies the BIOS code storage device modification information in the BIOS data storage device, and uses the BIOS code storage device modification information to modify the BIOS code storage device. As such, the accessing of BIOS code in the BIOS storage system by other components in the computing device during runtime of the computing device will not cause issues with the modification of the BIOS code storage device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) code storage subsystem modification system, comprising:

a computing device;

a Basic Input/Output System (BIOS) storage system that is included in the computing device and that includes a BIOS code storage device and a BIOS data storage device;

a BIOS code storage device modification subsystem that is included in the computing device and coupled to the BIOS storage system, wherein the BIOS code storage device modification subsystem is configured to:

receive a BIOS code storage device modification interrupt;

provide, in response to receiving the BIOS code storage device modification interrupt, BIOS code storage device modification information in the BIOS data storage device; and cause, subsequent to providing the BIOS code storage device modification information in the BIOS data storage device, the computing device to perform a first reboot;

a BIOS that is included in the computing device and coupled to the BIOS storage system, wherein the BIOS is configured, during a first initialization of the computing device in response to the first reboot, to:

identify the BIOS code storage device modification information in the BIOS data storage device;

use the BIOS code storage device modification information to modify the BIOS code storage device; and cause, subsequent to using the BIOS code storage device modification information to modify the BIOS code storage device, the computing device to perform a second reboot; and a processing system that is included in the computing device and coupled to the BIOS storage system, wherein the processing system is configured, during a second initialization of the computing device in response to the second reboot, to:

identify a scheduled operation to perform based the modification of the BIOS code storage device using the BIOS code storage device modification information; and perform the scheduled operation.

2. The system of claim 1, wherein the BIOS performs the operations of the BIOS code storage device modification subsystem.

3. The system of claim 1, wherein an application running on the computing device performs at least some of the operations of the BIOS code storage device modification subsystem.

4. The system of claim 1, wherein the BIOS is configured to:

erase, in response to using the BIOS code storage device modification information to modify the BIOS code storage device, the BIOS code storage device modification information from the BIOS data storage device.

5. The system of claim 1, wherein the BIOS code storage device modification information includes memory device repair scheduling information.

6. The system of claim 5, wherein the processing system is configured to:

identify the memory device repair scheduling information in the BIOS code storage device; and use the memory device repair scheduling information to perform memory repair operations on a memory device that is included in the computing device.

7. The system of claim 5, wherein the BIOS code storage device modification information including the memory device repair scheduling information is provided in a processor configuration block included in the BIOS code storage device.

8. An Information Handling System (IHS), comprising:

a processing system; and a memory system that is coupled to the processing system and that includes instructions that, when executed by the processing system, cause the processing system to provide a Basic Input/Output System (BIOS) code storage device modification engine that is configured to:

receive a BIOS code storage device modification interrupt;

provide, in response to receiving the BIOS code storage device modification interrupt, BIOS code storage device modification information in a BIOS data storage device that is included in a BIOS storage system;

cause, subsequent to providing the BIOS code storage device modification information in the BIOS data storage device, the IHS to perform a first reboot;

identify, during a first initialization of the IHS in response to the first reboot, the BIOS code storage device modification information in the BIOS data storage device; and use, during the first initialization of the IHS in response to the first reboot, the BIOS code storage device modification information to modify a BIOS code storage device that is included in a BIOS storage system;

cause, subsequent to using the BIOS code storage device modification information to modify the BIOS code storage device, the IHS to perform a second reboot, wherein the processing system is configured, during a second initialization of the computing device in response to the second reboot, to:

identify a scheduled operation to perform based the modification of the BIOS code storage device using the BIOS code storage device modification information; and perform the scheduled operation.

9. The IHS of claim 8, wherein the processing system is a BIOS processing system, and the memory system is a BIOS memory system that includes instruction that, when executed by the BIOS processing system, cause the BIOS processing system to provide a BIOS that is configured to perform the operations of the BIOS code storage device modification engine.

10. The IHS of claim 8, wherein the processing system includes a primary processing subsystem, and the memory system includes a primary memory subsystem including instruction that, when executed by the primary processing subsystem, cause the primary processing subsystem to provide an application that is included in the BIOS code storage device modification engine and that is configured to receive the BIOS code storage device modification interrupt, provide the BIOS code storage device modification information in the BIOS data storage device, and cause the IHS to perform the first reboot, and wherein the processing system includes a BIOS processing subsystem, and the memory system includes a BIOS memory subsystem including instruction that, when executed by the BIOS processing subsystem, cause the BIOS processing subsystem to provide a BIOS that is included in the BIOS code storage device modification engine and that is configured, during the first initialization of the IHS in response to the first reboot, to identify the BIOS code storage device modification information in the BIOS data storage device, and use the BIOS code storage device modification information to modify the BIOS code storage device.

11. The IHS of claim 8, wherein the BIOS code storage device modification engine is configured to:

erase, in response to using the BIOS code storage device modification information to modify the BIOS code storage device, the BIOS code storage device modification information from the BIOS data storage device.

12. The IHS of claim 8, wherein the BIOS code storage device modification information includes memory device repair scheduling information.

13. The IHS of claim 8, wherein the memory system includes instruction that, when executed by the processing subsystem, cause the processing subsystem to provide a memory repair engine that is configured, during a second initialization of the computing device in response to the second reboot, to:

use the memory device repair scheduling information to perform memory repair operations on a memory device that is included in the computing device.

14. A method for modifying a Basic Input/Output System (BIOS) code storage subsystem, comprising:

receiving, by a Basic Input/Output System (BIOS) code storage device modification subsystem, a BIOS code storage device modification interrupt;

providing, by the BIOS code storage device modification subsystem in response to receiving the BIOS code storage device modification interrupt, BIOS code storage device modification information in a BIOS data storage device that is included in a BIOS storage system;

causing, by the BIOS code storage device modification subsystem subsequent to providing the BIOS code storage device modification information in the BIOS data storage device, a computing device that includes the BIOS code storage device modification subsystem and the BIOS storage system to perform a first reboot;

identifying, by the BIOS code storage device modification subsystem during a first initialization of the computing device in response to the first reboot, the BIOS code storage device modification information in the BIOS data storage device;

using, by the BIOS code storage device modification subsystem during the first initialization of the computing device, the BIOS code storage device modification information to modify a BIOS code storage device that is included in a BIOS storage system;

causing, by the BIOS code storage device modification subsystem during the first initialization of the computing device and subsequent to using the BIOS code storage device modification information to modify the BIOS code storage device, the computing device to perform a second reboot;

identifying, by a processing system during a second initialization of the computing device in response to the second reboot, a scheduled operation to perform based the modification of the BIOS code storage device using the BIOS code storage device modification information; and performing, by the processing system during the second initialization of the computing device, the scheduled operation.

15. The method of claim 14, wherein a BIOS in the computing device performs the operations of the BIOS code storage device modification subsystem.

16. The method of claim 14, wherein an application running on the computing device performs at least some of the operations of the BIOS code storage device modification subsystem.

17. The method of claim 14, further comprising:

erasing, by the BIOS code storage device modification subsystem in response to using the BIOS code storage device modification information to modify the BIOS code storage device, the BIOS code storage device modification information from the BIOS data storage device.

18. The method of claim 14, wherein the BIOS code storage device modification information includes memory device repair scheduling information.

19. The method of claim 18, further comprising:

identifying, by the processing system during the second initialization of the computing device, the memory device repair scheduling information in the BIOS code storage device; and using, by the processing system during the second initialization of the computing device, the memory device repair scheduling information to perform memory repair operations on a memory device that is included in the computing device.

20. The method of claim 18, wherein the BIOS code storage device modification information including the memory device repair scheduling information is provided in a processor configuration block included in the BIOS code storage device.

* * * * *